(12) United States Patent
Tajima et al.

(10) Patent No.: US 9,919,698 B2
(45) Date of Patent: Mar. 20, 2018

(54) CONTROL DEVICE FOR VEHICLE DRIVING DEVICE

(71) Applicant: AISIN AW CO., LTD., Anjo-shi, Aichi-ken (JP)

(72) Inventors: Yoichi Tajima, Anjo (JP); Kohei Tsuda, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 56 days.

(21) Appl. No.: 15/118,282

(22) PCT Filed: Mar. 5, 2015

(86) PCT No.: PCT/JP2015/056490
§ 371 (c)(1),
(2) Date: Aug. 11, 2016

(87) PCT Pub. No.: WO2015/133570
PCT Pub. Date: Sep. 11, 2015

(65) Prior Publication Data
US 2016/0355173 A1    Dec. 8, 2016

(30) Foreign Application Priority Data

Mar. 5, 2014   (JP) ................................. 2014-042956

(51) Int. Cl.
*B60W 30/19*   (2012.01)
*B60W 20/15*   (2016.01)
(Continued)

(52) U.S. Cl.
CPC .............. *B60W 20/15* (2016.01); *B60K 6/36* (2013.01); *B60K 6/48* (2013.01); *B60K 6/547* (2013.01);
(Continued)

(58) Field of Classification Search
CPC ........... B60K 6/48; B60K 6/547; B60L 11/14; B60L 11/1861; B60L 15/2054;
(Continued)

(56) References Cited

U.S. PATENT DOCUMENTS 5,951,614 A     9/1999 Tabata et al.
7,766,107 B2 *  8/2010 Joe ........................... B60K 6/48
                                                        180/65.21
(Continued)

FOREIGN PATENT DOCUMENTS

JP    H09-331602 A    12/1997
JP    2007-069789 A    3/2007
(Continued)

OTHER PUBLICATIONS

Jun. 9, 2015 International Search Report issued in International Patent Application No. PCT/JP2015/056490.

*Primary Examiner* — Ryan Rink
(74) *Attorney, Agent, or Firm* — Oliff PLC

(57) ABSTRACT

A control device for a vehicle driving device which controls the vehicle driving device provided with a particular engagement device, a rotary electric machine, and a transmission apparatus disposed in a power transmission path coupling an internal combustion engine with wheels in order from the internal combustion engine side, wherein the transmission apparatus includes a plurality of engagement devices, and selectively forms a plurality of transmission shift stages different in transmission shift ratio according to a state of engagement of the plurality of engagement devices.

20 Claims, 9 Drawing Sheets

(51) Int. Cl.
| | |
|---|---|
| *B60K 6/48* | (2007.10) |
| *B60K 6/547* | (2007.10) |
| *B60L 11/14* | (2006.01) |
| *B60W 10/06* | (2006.01) |
| *B60W 10/08* | (2006.01) |
| *B60W 10/11* | (2012.01) |
| *B60L 15/20* | (2006.01) |
| *B60W 10/02* | (2006.01) |
| *B60W 10/04* | (2006.01) |
| *B60W 10/10* | (2012.01) |
| *B60W 20/00* | (2016.01) |
| *F16H 61/02* | (2006.01) |
| *F16H 63/50* | (2006.01) |
| *B60K 6/36* | (2007.10) |

(52) U.S. Cl.
CPC ........... *B60L 11/14* (2013.01); *B60L 15/2054* (2013.01); *B60W 10/02* (2013.01); *B60W 10/04* (2013.01); *B60W 10/06* (2013.01); *B60W 10/08* (2013.01); *B60W 10/10* (2013.01); *B60W 10/11* (2013.01); *B60W 20/00* (2013.01); *B60W 30/19* (2013.01); *F16H 61/0204* (2013.01); *F16H 63/502* (2013.01); *B60K 2006/4825* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60W 2510/0638* (2013.01); *B60W 2510/1005* (2013.01); *B60W 2600/00* (2013.01); *B60W 2710/021* (2013.01); *B60W 2710/025* (2013.01); *B60W 2710/027* (2013.01); *B60W 2710/0644* (2013.01); *B60W 2710/081* (2013.01); *B60W 2710/083* (2013.01); *B60W 2710/105* (2013.01); *B60W 2710/1005* (2013.01); *B60Y 2200/92* (2013.01); *B60Y 2300/19* (2013.01); *B60Y 2400/72* (2013.01); *Y02T 10/6221* (2013.01); *Y02T 10/6252* (2013.01); *Y02T 10/6286* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/93* (2013.01)

(58) Field of Classification Search
CPC ......... B60L 2240/421; B60L 2240/423; B60L 2240/441; B60L 2240/443; B60L 2240/486; B60W 10/06; B60W 10/08; B60W 10/115; B60W 20/00; B60W 20/10; B60W 2710/0666; B60W 2710/1022; B60W 30/19; F16H 61/061; F16H 63/502; Y02T 10/6221; Y02T 10/6286; Y02T 10/645; Y02T 10/70; Y02T 10/7005; Y02T 10/7044; Y02T 10/705; Y02T 10/7077; Y02T 10/7275; Y10S 903/903; Y10S 903/919; Y10S 903/945
See application file for complete search history.

(56) References Cited

U.S. PATENT DOCUMENTS

| | | | |
|---|---|---|---|
| 9,616,884 B1* | 4/2017 | Cho | B60W 20/40 |
| 2010/0197452 A1* | 8/2010 | Kaltenbach | B60W 10/08 477/14 |
| 2011/0021312 A1* | 1/2011 | Fukitani | B60K 6/48 477/5 |
| 2012/0078456 A1* | 3/2012 | Hakumura | B60L 3/003 701/22 |
| 2013/0131903 A1* | 5/2013 | Araki | B60L 11/14 701/22 |
| 2013/0317683 A1* | 11/2013 | Terakawa | B60K 6/48 701/22 |
| 2014/0163827 A1* | 6/2014 | Kim | B60W 10/11 701/54 |
| 2014/0330469 A1* | 11/2014 | Yoshida | B60W 10/06 701/22 |
| 2015/0167794 A1* | 6/2015 | Morio | F16H 3/78 475/5 |
| 2016/0107632 A1* | 4/2016 | Yang | B60W 20/30 701/22 |
| 2016/0137190 A1* | 5/2016 | Nedorezov | B60W 20/40 701/22 |
| 2017/0197609 A1* | 7/2017 | Colvin | B60W 10/08 |

FOREIGN PATENT DOCUMENTS

| | | |
|---|---|---|
| JP | 2010-149560 A | 7/2010 |
| JP | 2013-039912 A | 2/2013 |

\* cited by examiner

FIG. 4

|  | C1 | C2 | C3 | B1 | B2 | OWC |
|---|---|---|---|---|---|---|
| 1st | ○ |  |  |  | (○) | △ |
| 2nd | ○ |  |  | ○ |  |  |
| 3rd | ○ |  | ○ |  |  |  |
| 4th | ○ | ○ |  |  |  |  |
| 5th |  | ○ | ○ |  |  |  |
| 6th |  | ○ |  | ○ |  |  |
| Rev |  |  | ○ |  | ○ |  |

CONTROL DEVICE FOR VEHICLE DRIVING DEVICE

BACKGROUND

The present disclosure relates to a control device for controlling a vehicle driving device having a particular engagement device, a rotary electric machine, and a transmission apparatus disposed in a power transmission path coupling an internal combustion engine with wheels in order from the internal combustion engine side.

In the control device described above, for example, a technique disclosed in the following JP-A-1997 (Hei-9)-331602 has already been known. In the technique disclosed in JP-A-1997 (Hei-9)-331602, an upshift control (referred to as "on upshift control") is performed while maintaining the particular engagement device in a direct engagement state from a state in which a torque in forward acceleration direction is transmitted to the wheels.

SUMMARY

However, as disclosed in JP-A-1997 (Hei-9)-331602, when the particular engagement device is maintained in the direct engagement state, the internal combustion engine rotates integrally with the rotary electric machine, and an inertial moment of a rotary member that rotates integrally with the rotary electric machine increases. For that reason, there is a limit to shorten a period in which a rotational speed of the rotary electric machine is reduced for decreasing a rotational speed difference of an engagement side engagement device of the transmission apparatus during the on upshift control.

Under the circumstance, the control device capable of shortening the period in which the rotational speed of the rotary electric machine is reduced for decreasing the rotational speed difference of the engagement side engagement device of the transmission apparatus in the on upshift control has been demanded.

A control device, according to an exemplary aspect of the disclosure, for controlling a vehicle driving device having a particular engagement device, a rotary electric machine, and a transmission apparatus disposed in a power transmission path coupling an internal combustion engine with wheels in order from the internal combustion engine side according to the present disclosure resides in that the transmission apparatus includes a plurality of engagement devices, and selectively forms a plurality of transmission shift stages different in transmission shift ratio according to a state of engagement of the plurality of engagement devices; the control device includes an electronic control unit that includes control logic, which when executed, executes an on upshift control for controlling engagement and release of the plurality of engagement devices to switch the transmission shift stage to a transmission shift stage smaller in the transmission shift ratio from a state in which the particular engagement device transmits a torque in a forward acceleration direction to the wheels in a direct engagement state; and controls the particular engagement device into a slip engagement state, and reduces a rotational speed of the rotary electric machine relative to a rotational speed of the internal combustion engine when decreasing a rotational speed difference between a pair of engagement members of an engagement side engagement device which is the engagement device engaged for switching the transmission shift stage during execution of the on upshift control.

In the present specification, the "rotary electric machine" is used as a concept including all of a motor (electric motor), a generator (power generator), and a motor-generator that performs both functions of the motor and the generator as occasion demands.

According to the characteristic configuration described above, in the case of decreasing the rotational speed difference of the engagement side engagement device, since the particular engagement device is controlled into the slip engagement state, the internal combustion engine does not rotate integrally with the rotary electric machine, and an inertial system of the internal combustion engine can be isolated from an inertial system of the rotary electric machine, Hence, an inertial moment of the rotary member that rotates integrally with the rotary electric machine can be remarkably reduced by an amount corresponding to the inertial moment of the internal combustion engine, and a period in which the rotational speed of the rotary electric machine is reduced to decrease the rotational speed difference of the engagement side engagement device can be shortened.

Further, according to the above characteristic configuration, when the rotational speed difference of the engagement side engagement device is decreased, since the particular engagement device is controlled into the slip engagement state, and the rotational speed of the rotary electric machine is reduced relative to the rotational speed of the internal combustion engine, a reduction in the rotational speed of the internal combustion engine is suppressed, Hence, a driving force used for decreasing the rotational speed of the internal combustion engine can be suppressed to be lower, and a driving force used for decreasing the rotational speed of the rotary electric machine can be restrained from being reduced, From this viewpoint, the period in which the rotational speed difference of the engagement side engagement device is decreased can be shortened.

In this example, it is preferable that the electronic control unit controls both of the engagement side engagement device and the particular engagement device into the slip engagement state when decreasing the rotational speed difference of the engagement side engagement device.

According to the above configuration, when decreasing the rotational speed difference of the engagement side engagement device, an output torque of the internal combustion engine can be transmitted to the wheels through the particular engagement device and the engagement side engagement device which have been controlled into the slip engagement state, and the driving force can be restrained from being reduced during the on upshift control.

In addition, since the engagement side engagement device is controlled into the slip engagement state during the on upshift control, the engagement side engagement device generates a heat due to friction. However, because the period in which the rotational speed difference of the engagement side engagement device is decreased is shortened, and the period in which the engagement side engagement device is brought into the slip engagement state is reduced, the heat generation of the engagement side engagement device can be suppressed, and the durability can be improved.

In this example, it is preferable that the electronic control unit reduces the output torque of the rotary electric machine, to thereby reduce the rotational speed of the rotary electric machine, and decrease the rotational speed difference of the engagement side engagement device.

According to the above configuration, the rotational speed of the rotary electric machine can be reduced with high precision according to the output torque of the rotary electric machine high in controllability. Further, because there is no need to change an engagement pressure of the engagement side engagement device for the purpose of reducing the rotational speed of the rotary electric machine, the driving force to be transmitted to the wheels through the engagement side engagement device can be restrained from being varied.

In this example, it is preferable that the electronic control unit decreases the rotational speed difference between the pair of engagement members of the particular engagement device after decreasing the rotational speed difference of the engagement side engagement device down to a predetermined rotational speed difference.

According to the above configuration, because the driving force of a driving force source can be used in highest priority to the decrease in the rotational speed difference of the engagement side engagement device more than the decrease in the rotational speed difference of the particular engagement device, the period in which the rotational speed difference of the engagement side engagement device is decreased can be shortened.

In this example, it is preferable that the electronic control unit decreases the rotational speed difference of the particular engagement device down to zero after decreasing the rotational speed difference of the engagement side engagement device down to zero.

According to the above configuration, the driving force of the driving force source can be used highest in priority to the decrease in the rotational speed difference of the engagement side engagement device.

In this example, it is preferable that the electronic control unit decreases the rotational speed difference of the particular engagement device down to zero after decreasing the rotational speed difference of the engagement side engagement device down to a target rotational speed difference set to a value larger than zero in advance, and thereafter decreases the rotational speed difference of the engagement side engagement device down to zero.

According to the above configuration, since the engagement side engagement device is maintained in the slip engagement state while decreasing the rotational speed difference of the particular engagement device, a torque fluctuation caused by the decrease in the rotational speed difference of the particular engagement device can be restrained from being transmitted to the wheels through the transmission apparatus.

Further, since the rotational speed difference of the engagement side engagement device is decreased down to the target rotational speed difference, when the engagement side engagement device is controlled into the slip engagement state, the heat generation of the engagement side engagement device cannot be reduced to zero, but can be remarkably reduced by a decrease in the rotational speed difference. As a result, the durability of the engagement side engagement device can be improved.

In this example, it is preferable that the electronic control unit executes a rotational speed control for changing the output torque of the rotary electric machine so that the rotational speed difference of the engagement side engagement device is maintained at the target rotational speed difference after decreasing the rotational speed difference of the engagement side engagement device down to the target rotational speed difference.

According to the above configuration, the rotational speed difference of the engagement side engagement device can be more surely maintained at the target rotational speed difference, and the engagement side engagement device can be maintained in the slip engagement state, under the rotational speed control associated with the output torque of the rotary electric machine high in the controllability.

In this example, it is preferable that the electronic control unit maintains the rotational speed of the internal combustion engine at the rotational speed corresponding to the rotational speed of the internal combustion engine before starting the on upshift control while increasing the rotational speed difference of the particular engagement device, and reduces the rotational speed of the internal combustion engine from the rotational speed corresponding to the rotational speed of the internal combustion engine before starting the on upshift control while decreasing the rotational speed difference of the particular engagement device.

According to the above configuration, the driving force of the driving force source can be prevented from being used for reducing the rotational speed of the internal combustion engine while the rotational speed difference of the particular engagement device is being decreased.

In this example, it is preferable that the electronic control unit increases a transmission torque capacity of the particular engagement device to decrease the rotational speed difference of the particular engagement device and reduces the output torque of the rotary electric machine according to an increase in the transmission torque capacity of the particular engagement device.

According to the above configuration, because a total torque acting on the inertial system of the internal combustion engine can be made negative due to an increase in the transmission torque capacity of the particular engagement device, the rotational speed of the internal combustion engine can be reduced. In addition, a transmission torque of the particular engagement device to be transmitted to the wheel side from the internal combustion engine side is increased due to the increase in the transmission torque capacity of the particular engagement device. Since the output torque of the rotary electric machine is reduced according to the increase in the transmission torque capacity of the particular engagement device, the increase in the transmission torque of the particular engagement device is offset by the reduction in the output torque of the rotary electric machine. Hence, the torque to be transmitted to the wheel side through the engagement side engagement device that has been brought into the direct engagement state can be restrained from being varied.

BRIEF DESCRIPTION OF THE DRAWINGS

FIG. 4 is an operation table for a transmission apparatus according to the embodiment of the present disclosure.

DETAILED DESCRIPTION OF EMBODIMENTS

Figure 1:
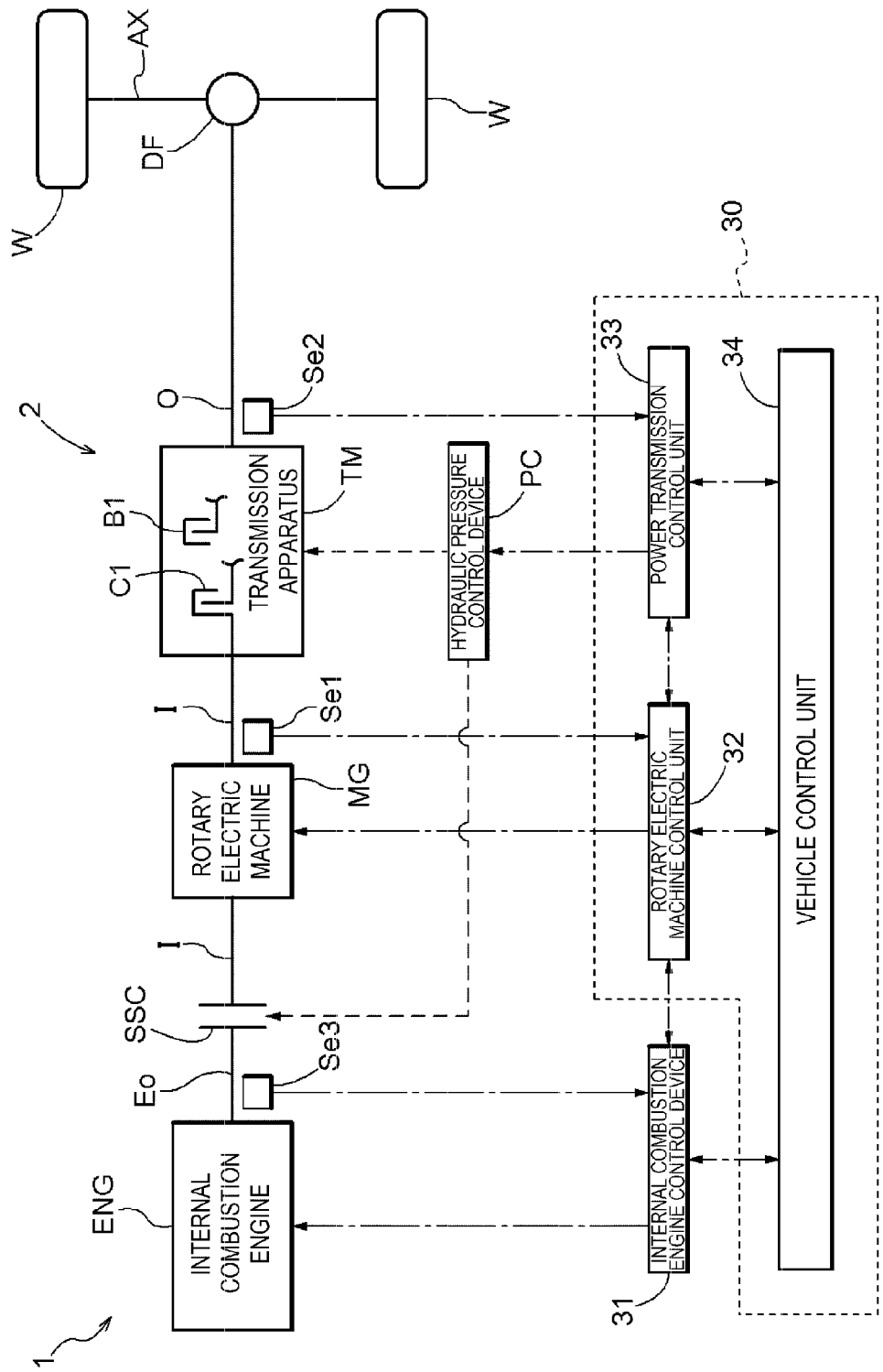
FIG. 1 is a schematic diagram illustrating a general configuration of a vehicle driving device and a control device according to an embodiment of the present disclosure.

A control device 30 (hereinafter referred to merely as "control device 30") for a vehicle driving device 1 according to the present disclosure will be described with reference to the drawings. FIG. 1 is a schematic diagram illustrating a general configuration of the vehicle driving device 1 and the control device 30 according to the present embodiment. In the figure, solid lines indicate a transmission path of a driving force, dashed lines indicate supply paths of a working oil, and chain lines indicate transmission paths of signals.

In vehicle driving device 1, a particular engagement device SSC, a rotary electric machine MG, and a transmission apparatus TM are disposed in a power transmission path 2 coupling an internal combustion engine ENG with wheels W in order from the internal combustion engine ENG side. The particular engagement device SSC selectively brings the internal combustion engine ENG and the rotary electric machine MG into a coupled state or a separated state according to an engagement state of the particular engagement device SSC. The transmission apparatus TM includes a plurality of engagement devices C1, B1, . . . , and selectively forms a plurality of transmission shift stages different in transmission shift ratio according to a state of engagement of the plurality of engagement devices C1, B1, . . . .

A hybrid vehicle includes the control device 30 for controlling the vehicle driving device 1. The control device 30 according to the present embodiment includes a rotary electric machine control unit 32 for controlling the rotary electric machine MG, a power transmission control unit 33 for controlling the transmission apparatus TM and the particular engagement device SSC, and a vehicle control unit 34 that integrates those control units for controlling the vehicle driving device 1. In addition, the hybrid vehicle includes an internal combustion engine control device 31 for controlling the internal combustion engine ENG.

Figure 2:
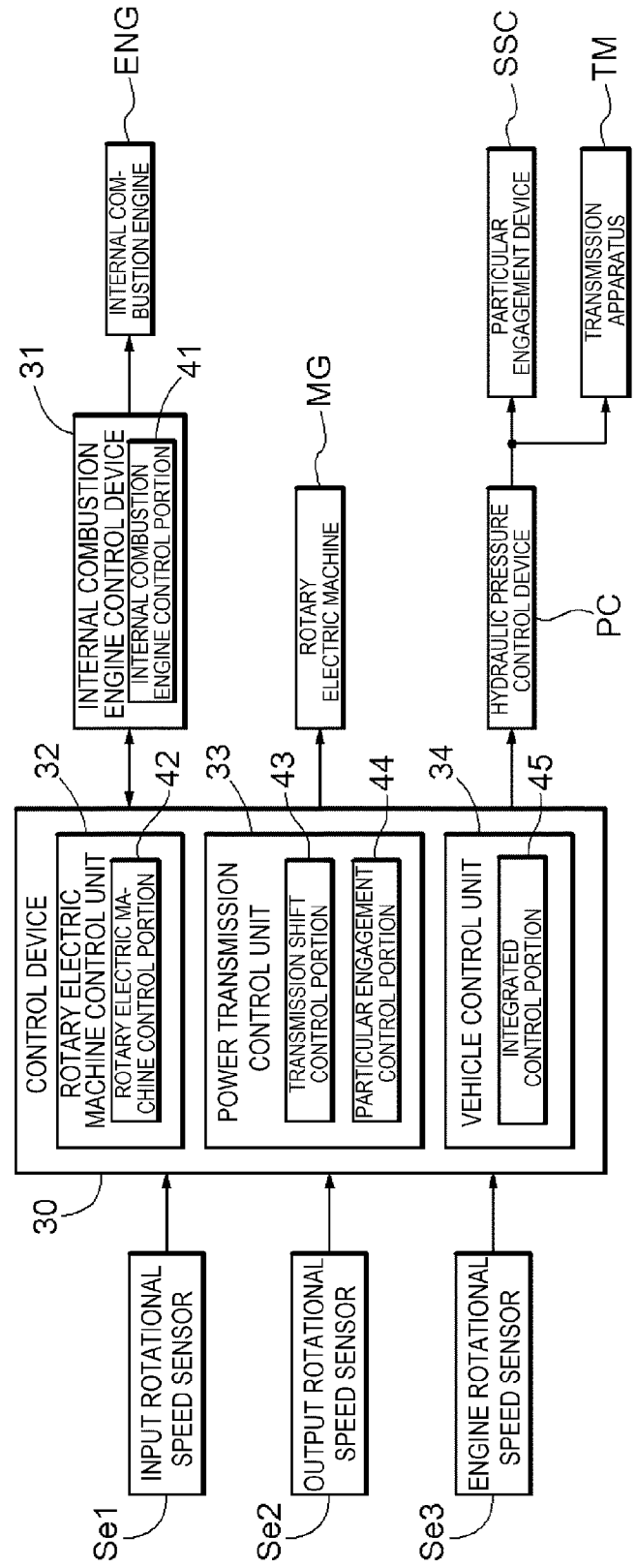
FIG. 2 is a block diagram illustrating a general configuration of the control device according to the embodiment of the present disclosure.

As illustrated in FIG. 2, the control device 30 includes functional portions such as a transmission shift control portion 43 and so on.

The transmission shift control portion 43 (i.e., electronic control unit) performs a shift control for controlling the engagement and release of the plurality of engagement devices C1, B1, . . . to switch the transmission shift stage formed in the transmission apparatus TM to another. The transmission shift control portion 43 according to the present embodiment is configured to execute an on upshift control for controlling the engagement and release of the plurality of engagement devices C1, B1, . . . to switch the transmission shift stage to a transmission shift stage smaller in the transmission shift ratio from a state in which the particular engagement device SSC transmits a torque in a forward acceleration direction to the wheels W in a direct engagement state.

In the configuration described above, the transmission shift control portion 43 is characterized by performing a specific engagement slip control for controlling the particular engagement device SSC into the slip engagement state and for reducing the rotational speed of the rotary electric machine MG relative to the rotational speed of the internal combustion engine ENG when decreasing a rotational speed difference ΔW1 between a pair of engagement members of the engagement side engagement device that is an engagement device engaged for switching the transmission shift stage to another during execution of the on upshift control.

Hereinafter, the vehicle driving device 1 and the control device 30 according to the present embodiment will be described in detail.

1. Configuration of Vehicle Driving Device 1

First, a configuration of the vehicle driving device 1 for a hybrid vehicle according to the present embodiment will be described. As illustrated in FIG. 1, the hybrid vehicle is configured by a parallel type hybrid vehicle having the internal combustion engine ENG and the rotary electric machine MG as the driving force sources of the vehicle in which the internal combustion engine ENG and the rotary electric machine MG are drivingly coupled in series with each other. The hybrid vehicle includes the transmission apparatus TM, and changes the rotational speed of the internal combustion engine ENG and the rotary electric machine MG, and also converts the torque thereof, which have been transmitted to an input shaft I, by the transmission apparatus TM to transmit the changed rotational speed and the converted torque to an output shaft O.

The internal combustion engine ENG is a thermal engine driven by combustion of a fuel, and may be various types of known internal combustion engines such as, for example, a gasoline engine and a diesel engine. In this example, an internal combustion engine output shaft Eo of the internal combustion engine ENG such as a crankshaft is selectively drivingly coupled with the input shaft I drivingly coupled with the rotary electric machine MG through the particular engagement device SSC. In other words, the internal combustion engine ENG is selectively drivingly coupled with the rotary electric machine MG through the particular engagement device SSC that is a friction engagement device. In addition, the internal combustion engine output shaft Eo is provided with a damper not shown so as to attenuate a variation in the output torque and the rotational speed which is caused by intermittent combustion of the internal combustion engine ENG, and to transmit the output torque and the rotational speed to the wheels W side.

Figure 3:
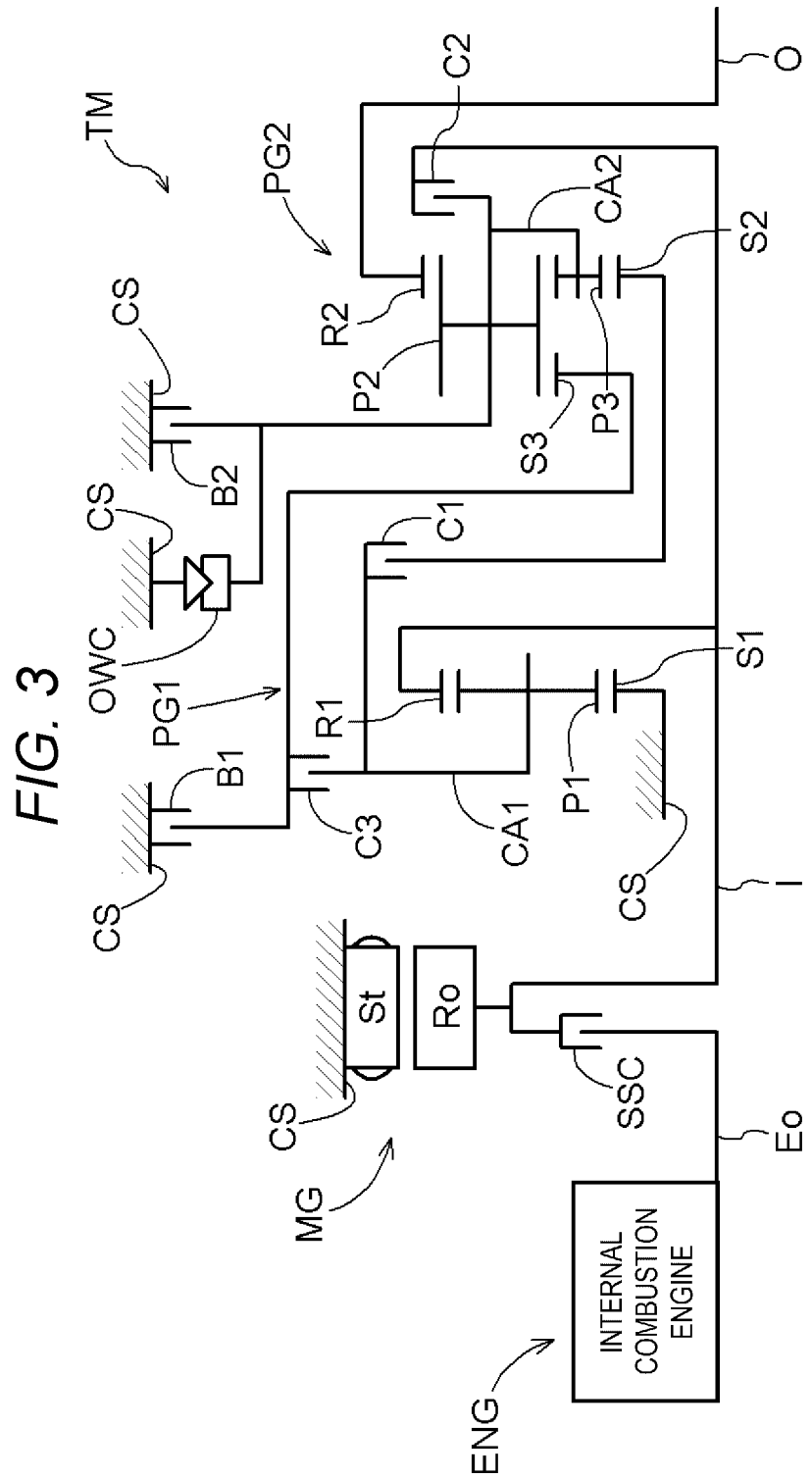
FIG. 3 is a skeleton diagram of the vehicle driving device according to the embodiment of the present disclosure.

The rotary electric machine MG includes a stator St fixed to a case CS that houses the vehicle driving device 1, and a rotor Ro rotatably supported at a position corresponding to the stator on a radially inner side of the case (refer to FIG. 3). The rotor Ro of the rotary electric machine MG is drivingly coupled with the input shaft I so as to rotate integrally with the input shaft I. The rotary electric machine MG is electrically connected to a battery serving as a power storage device through an inverter that performs DC-AC conversion. The rotary electric machine MG can function as a motor (electric motor) that receives an electric power to generate a motive power, and function as a generator (power generator) that receives the motive power to generate the electric power. In other words, the rotary electric machine MG is powered upon receiving the electric power from the battery through the inverter, or generates the electric power by a rotary driving force transmitted from the internal combustion engine ENG or the wheels W, and the generated electric power is accumulated in the battery through the inverter.

The input shaft I that is drivingly coupled with the driving force source is drivingly coupled with the transmission apparatus TM. In the present embodiment, the transmission apparatus TM is a stepped automatic transmission apparatus having a plurality of transmission shift stages different in the transmission shift ratio. In order to form the plurality of transmission shift stages, the transmission apparatus TM includes a gear mechanism such as a planetary gear mechanism and a plurality of engagement devices C1, B1, . . . . The transmission apparatus TM changes a rotational speed of the input shaft I and converts a torque of the input shaft I at the transmission shift ratio of each transmission shift stage, and transmits the changed the rotational speed and the converted torque to the output shaft O. The torque that has been transmitted to the output shaft O from the transmission apparatus TM is distributed to two right and left axles AX through an output differential gear device DF, and transmitted to the wheels W drivingly coupled to the respective axles AX. In this example, the transmission shift ratio represents a ratio of the rotational speed of the input shaft I to the rotational speed of the output shaft O when each transmission shift stage is formed in the transmission apparatus TM, and in the present disclosure, the transmission shift ratio represents a value obtained by dividing the rotational speed of the input shaft I by the rotational speed of the output shaft O. In other words, the rotational speed obtained by dividing the rotational speed of the input shaft I by the transmission shift ratio represents the rotational speed of the output shaft O. In addition, the torque obtained by multiplying the torque to be transmitted from the input shaft I to the transmission apparatus TM by the transmission shift ratio represents the torque to be transmitted from the transmission apparatus TM to the output shaft O.

Figure 4:
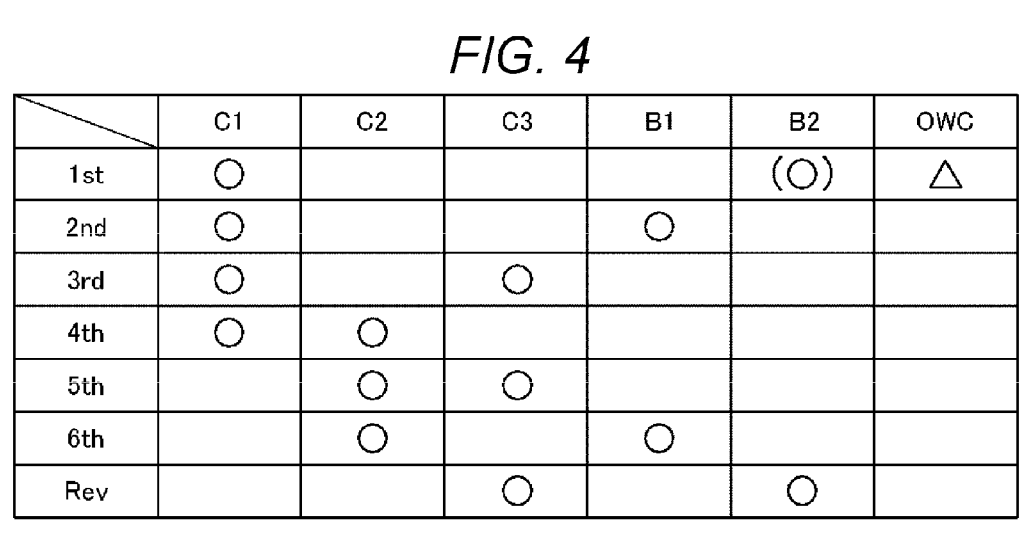

In the present embodiment, as shown in an operation table of FIG. 4, the transmission apparatus TM is provided with six transmission shift stages (first stage "1st", second stage "2nd", third stage "3rd", fourth stage "4th", fifth stage "5th", and sixth stage "6th") different in the transmission shift ratio (reduction ratio) as forward stages. In order to configure those transmission shift stages, the transmission apparatus TM includes a gear mechanism having a first planetary gear mechanism PG1 and a second planetary gear mechanism PG2, and six engagement devices C1, C2, C3, B1, B2, and OWC. The engagement and release of the plurality of engagement devices C1, B1, . . . except for the one-way clutch OWC are controlled to switch a rotating state of each rotary element of the first planetary gear mechanism PG1 and the second planetary gear mechanism PG2 to another, and to selectively engage the plurality of engagement devices C1, B1, . . . , thereby switching the six transmission shift stages. The transmission apparatus TM includes one reverse stage Rev in addition to the six transmission shift stages described above.

Referring to FIG. 4, a mark "○" indicates that each engagement device is in an engagement state, and "no mark" indicates that each engagement device is in a release state. A mark "(○)" indicates that the engagement device is brought into the engagement state when effecting an engine brake. In addition, a mark "Δ" indicates that the engagement device comes into the release state when the rotary element rotates in one way, and comes into the engagement state when the rotary element rotates in the other way.

The first stage (1st) is provided in a state where the first clutch C1 and the one-way clutch OWC are engaged with each other. When the engine brake is effected, the first stage is provided in a state where the first clutch C1 is engaged with the second brake B2. The second stage (2nd) is provided in a state where the first clutch C1 is engaged with the first brake B1. The third stage (3rd) is provided in a state where the first clutch C1 is engaged with the third clutch C3. The fourth stage (4th) is provided in a state where the first clutch C1 is engaged with the second clutch C2. The fifth stage (5th) is provided in a state where the second clutch C2 is engaged with the third clutch C3. The sixth stage (6th) is provided in a state where the second clutch C2 is engaged with the first brake B1.

The reverse stage (Rev) is provided in a state where the third clutch C3 is engaged with the second brake B2.

Those respective transmission shift stages configure the first stage, the second stage, the third stage, the fourth stage, the fifth stage, and the sixth stage in descending order of the transmission shift ratio (reduction ratio) between the input shaft I (internal combustion engine E) and the output shaft O.

As illustrated in FIG. 3, the first planetary gear mechanism PG1 is configured by a single pinion planetary gear mechanism having three rotary elements of a carrier CA1 that supports a plurality of pinion gears P1, and a sun gear S1 and a ring gear R1 which are meshed respectively with the pinion gears P1. The second planetary gear mechanism PG2 is configured by a Ravigneau type planetary gear mechanism with four rotary elements having two sun gears of a first sun gear S2 and a second sun gear S3, a ring gear R2, and a common carrier CA2 that supports a long pinion gear P2 that meshes with both of the first sun gear S2 and the ring gear R2 and a short pinion gear P3 that meshes with the long pinion gear P2 and the second sun gear S3.

The sun gear S1 of the first planetary gear mechanism PG1 is fixed to the case CS as a non-rotary member. The carrier CA1 is selectively drivingly coupled with the second sun gear S3 of the second planetary gear mechanism PG2 so as to rotate integrally with the second sun gear S3 by the aid of the third clutch C3. The carrier CA1 is also selectively drivingly coupled with the first sun gear S2 of the second planetary gear mechanism PG2 by the aid of the first clutch C1 so as to rotate integrally with the first sun gear S2 by the aid of the first clutch C1. The carrier CA1 is selectively fixed to the case CS by the aid of the first brake B1. The ring gear R1 is drivingly coupled to the input shaft I so as to rotate integrally with the input shaft I.

The first sun gear S2 of the second planetary gear mechanism PG2 is selectively drivingly coupled with the carrier CA1 of the first planetary gear mechanism PG1 so as to rotate integrally with the carrier CA1 by the aid of the first clutch C1. The carrier CA2 is selectively drivingly coupled with the input shaft I so as to rotate integrally with the input shaft I by the aid of the second clutch C2. The common carrier CA2 is also selectively fixed to the case CS as the non-rotary member by the aid of the second brake B2 or the one-way clutch OWC. The one-way clutch OWC blocks only the rotation in one way to selectively fix the carrier CA2 to the case CS. The ring gear R2 is drivingly coupled to the output shaft O so as to rotate integrally with the output shaft O. The second sun gear S3 is selectively drivingly coupled with the carrier CA1 of the first planetary gear mechanism PG1 so as to rotate integrally with the carrier CA1 by the aid of the third clutch C3. The second sun gear S3 is also selectively fixed to the case CS by the aid of the first brake B1.

In the present embodiment, the plurality of engagement devices C1, C2, C3, B1, and B2 except for the one-way clutch OWC provided in the transmission apparatus TM are each configured by a friction engagement device. Specifically, those devices are each configured by a multi-plate clutch or a multi-plate brake which is operated by a hydraulic pressure. The engagement devices C1, C2, C3, B1, and B2 are controlled in an engagement state due to the hydraulic pressure supplied from a hydraulic pressure control device PC. The particular engagement device SSC is also configured by a friction engagement device.

The friction engagement device transfers a torque between the pair of engagement members by the aid of a friction between the engagement members. When a rotational speed difference (slip) is present between the pair of engagement members of the friction engagement device, a torque (slip torque) of the transmission torque capacity is transferred from the member with a higher rotational speed to the member with a lower rotational speed by the aid of kinetic friction. When no rotational speed difference (slip) is present between the engagement members of the friction engagement device, the friction engagement device transfers a torque up to the transmission torque capacity acting between the engagement members of the friction engagement device by the aid of the static friction. In the present specification, the transmission torque capacity is a maximum torque that can be transferred by the friction engagement device by the aid of friction. The transmission torque capacity changes in proportion to an engagement pressure of the friction engagement device. The engagement pressure is a pressure at which an input side engagement member (friction disc) and an output side engagement member (friction disc) are pushed against each other. In the embodiment, the engagement pressure changes in proportion to the supplied hydraulic pressure. In other words, in the present embodiment, the transmission torque capacity changes in proportion to the magnitude of the hydraulic pressure supplied to the friction engagement device.

Each of the friction engagement devices has a return spring and is biased to the release side by the aid of a reaction force of the spring. When a force caused by the hydraulic pressure supplied to a hydraulic cylinder of each friction engagement device exceeds the reaction force of the spring, a transmission torque capacity starts to be generated in each friction engagement devices, and each friction engagement device changes from the release state to the engagement state. The hydraulic pressure at which a transmission torque capacity starts to be generated is referred to as "stroke end pressure". In each friction engagement device, the transmission torque capacity increases in proportion to an increase in the hydraulic pressure after the supplied hydraulic pressure exceeds the stroke end pressure. The friction engagement device may have no return spring and may be controlled according to a difference between hydraulic pressures applied to both sides of a piston of the hydraulic cylinder.

In the present embodiment, the engagement state is a state in which a transmission torque capacity is generated in the engagement device, and includes a slip engagement state and a direct engagement state. The release state is a state in which no transmission torque capacity is generated in the engagement device. The slip engagement state is an engagement state in which a difference (slip) in rotational speed is present between engagement members of an engagement device and the direct engagement state is an engagement state in which no rotational speed difference (slip) is present between engagement members of an engagement device. In addition, an indirect engagement state is an engagement state other than the direct engagement state and includes the release state and the slip engagement state.

Even when the control device 30 does not issue a command for generating the transmission torque capacity to the friction engagement device, a transmission torque capacity may be generated by dragging between engagement members (friction members). For example, even when the piston does not push the friction members against each other, the respective friction members may contact with each other, and the transmission torque capacity may be generated due to the dragging between the respective friction members. Under the circumstance, it is assumed that the "release state" includes the state in which the transmission torque capacity is generated by dragging between the respective friction members when the control device 30 does not issue the command for generating the transmission torque capacity to the friction engagement device.

2. Configuration of Hydraulic Pressure Control System

A hydraulic pressure control system of the vehicle driving device 1 includes the hydraulic pressure control device PC for regulating a hydraulic pressure of a working oil supplied from a hydraulic pump MP driven by a vehicle driving force source or a dedicated motor to a predetermined pressure. The hydraulic pressure control device PC includes a plurality of hydraulic pressure control valves such as linear solenoid valves for regulating the hydraulic pressure supplied to the respective engagement devices C1, B1, . . . , SSC and the like. The hydraulic pressure control valve regulates the openings of the valves according to a signal value of a hydraulic pressure instruction supplied from the control device 30, to thereby supply the working oil of the hydraulic pressure corresponding to the signal value to each of the engagement devices C1, B1, . . . , SSC and the like. The signal value supplied to each linear solenoid valve from the control device 30 is represented by a current value. The hydraulic pressure output from each linear solenoid valve is basically in proportion to the current value supplied from the control device 30.

The hydraulic pressure control device PC regulates the openings of one or more regulating valves on the basis of a hydraulic pressure (signal pressure) output from a hydraulic regulating linear solenoid valve, to thereby regulate the amounts of the working oil drained from the regulating valves and regulate the hydraulic pressures of the working oil to one or more predetermined pressures. The working oil regulated to the predetermined pressures are supplied to the plurality of engagement devices C1, B1 . . . and the particular engagement device SSC provided in the transmission apparatus TM with hydraulic pressures of levels required, respectively.

3. Configuration of Control Device

Next, configurations of the control device 30 for controlling the vehicle driving device 1 and the internal combustion engine control device 31 will be described with reference to FIG. 2.

The control units 32 to 34 of the control device 30 and the internal combustion engine control device 31 each include a calculation processing unit such as a CPU as a core member, and a storage device such as a RAM (random access memory) that can read and write data with respect to the calculation processing unit, and a ROM (read-only memory) that can read data from the calculation processing unit. In addition, functional portions 41 to 45 and the like of the control device 30 are configured by software (programs) stored in the ROM of the control device, hardware such as a computing circuit provided separately, or both of those software and hardware. In addition, the control units 32 to 34 of the control device 30 and the internal combustion engine control device 31 are configured so as to communicate with each other, share various types of information such as detected information by sensors and control parameters, and perform cooperative control to achieve the functions of the respective functional portions 41 to 45.

In addition, the vehicle driving device 1 has sensors such as sensors Se1 to Se3 and electric signals output from the respective sensors are input to the control device 30 and the internal combustion engine control device 31. The control device 30 and the internal combustion engine control device 31 calculate the detected information by the respective sensors based on the input electric signals.

The input rotational speed sensor Se1 is configured to detect the rotational speed of the input shaft I. Since the input shaft I is integrally drivingly coupled with a rotor Ro of the rotary electric machine MG, the rotary electric machine control unit 32 detects a rotational speed (angular velocity) of the rotary electric machine MG and the rotational speed of the input shaft I on the basis of an input signal of the input rotational speed sensor Se1. The output rotational speed sensor Se2 is configured to detect the rotational speed of the output shaft O. The power transmission control unit 33 detects the rotational speed (angular velocity) of the output shaft O on the basis of an input signal of the output rotational speed sensor Se2. In addition because the rotational speed of the output shaft O is in proportion to a vehicle speed, the power transmission control unit 33 calculates the vehicle speed on the basis of the input signal of the output rotational speed sensor Se2. The engine rotational speed sensor Se3 is configured to detect the rotational speed of the internal combustion engine output shaft Eo (internal combustion engine ENG). The internal combustion engine control device 31 detects the rotational speed (angular velocity) of the internal combustion engine ENG on the basis of an input signal of the engine rotational speed sensor Se3.

3-1. Vehicle Control Unit 34

The vehicle control unit 34 includes an integrated control portion 45. The integrated control portion 45 performs a control for integrating the various torque controls to be exerted on the internal combustion engine ENG, the rotary electric machine MG, the transmission apparatus TM, and the particular engagement device SSC, and the engagement controls of the respective engagement devices as the overall vehicle.

The integrated control portion 45 calculates a vehicle request torque Trq that is a target driving force transmitted from the input shaft I side to the output shaft O side, which is a torque requested for driving the wheels W according to an accelerator opening, the vehicle speed, and the charge amount of the battery, and also determines an operation mode of the internal combustion engine ENG and the rotary electric machine MG. The operation mode includes an electric mode for traveling with only the rotary electric machine MG as the driving force source, and a parallel mode for traveling with at least the internal combustion engine ENG as the driving force source. For example, when the accelerator opening is small and the charge amount in the battery is large, the electric mode is determined as the operation mode, and in other cases, that is, when the accelerator opening is large or the charge amount in the battery is small, the parallel mode is determined as the operation mode.

The integrated control portion 45 calculates an internal combustion engine request torque that is an output torque required for the internal combustion engine ENG, a rotary electric machine request torque that is an output torque required for the rotary electric machine MG, and a hydraulic pressure instruction that is a target of a hydraulic pressure to be supplied to the particular engagement device SSC, and a hydraulic pressure instruction that is a target of a hydraulic pressure to be supplied to the respective engagement devices C1, B1, . . . of the transmission apparatus TM on the basis of the vehicle request torque Trq, the operation mode, and the charge amount in the battery. Then, the integrated control portion 45 transmits those calculated torques or commands to the other control units 32, 33, and the internal combustion engine control device 31 to perform the integrated control. Basically, a total of the internal combustion engine request torque and the rotary electric machine request torque is set to match the vehicle request torque Trq.

3-2. Internal Combustion Engine Control Device 31

The internal combustion engine control device 31 has the internal combustion engine control portion 41 that performs the operation control of the internal combustion engine ENG. In the present embodiment, when the internal combustion engine control portion 41 receives an instruction about the internal combustion engine request torque from the integrated control portion 45 or the transmission shift control portion 43, the internal combustion engine control portion 41 performs the torque control so that the internal combustion engine ENG outputs the internal combustion engine request torque.

3-3. Rotary Electric Machine Control Unit 32

The rotary electric machine control unit 32 includes a rotary electric machine control portion 42 that performs the operation control of the rotary electric machine MG. In the present embodiment, when the rotary electric machine control portion 42 receives an instruction about the rotary electric machine request torque from the integrated control portion 45 or the transmission shift control portion 43, the rotary electric machine control portion 42 controls the rotary electric machine MG to output the rotary electric machine request torque. Specifically, the rotary electric machine control portion 42 controls the on/off operation of a plurality of switching elements provided in the inverter to control the output torque of the rotary electric machine MG.

3-4. Power Transmission Control Unit 33

The power transmission control unit 33 includes a transmission shift control portion 43 that controls the transmission apparatus TM and a particular engagement control portion 44 that controls the particular engagement device SSC.

3-4-1, Particular Engagement Control Portion 44

The particular engagement control portion 44 controls an engagement state of the particular engagement device SSC. In the present embodiment, the particular engagement control portion 44 controls the signal value to be supplied to each linear solenoid valve provided in the hydraulic pressure control device PC so that the hydraulic pressure to be supplied to the particular engagement device SSC matches the hydraulic pressure instruction of the particular engagement device SSC instructed from the integrated control portion 45 or the transmission shift control portion 43.

3-4-2. Transmission Shift Control Portion 43

The transmission shift control portion 43 performs a shift control for controlling the engagement and release of the plurality of engagement devices C1, B1, . . . to switch the transmission shift stage formed in the transmission apparatus TM to another.

In the present embodiment, the transmission shift control portion 43 determines a target transmission shift stage provided in the transmission apparatus TM on the basis of sensor detection information such as the vehicle speed, the accelerator opening, and the shift position. The transmission shift control portion 43 controls the hydraulic pressures supplied to the plurality of engagement devices C1, B1, . . . included in the transmission apparatus TM through the hydraulic pressure control device PC, to thereby engage or release the respective engagement devices C1, B1, . . . , and provide the target transmission shift stage in the transmission apparatus TM. Specifically, the transmission shift control portion 43 instructs the hydraulic pressure control device PC about the target hydraulic pressures (hydraulic pressure instructions) of the respective engagement devices, and the hydraulic pressure control device PC supplies the hydraulic pressures corresponding to the instructed target hydraulic pressures (hydraulic pressure instructions) to the respective engagement devices. In the present embodiment, the transmission shift control portion 43 controls the signal values to be supplied to the respective linear solenoid valves provided in the hydraulic pressure control device PC, to thereby control the hydraulic pressures to be supplied to the respective engagement devices.

In the present embodiment, the transmission shift control portion 43 determines the target transmission shift stage with reference to a transmission shift map stored in a memory not shown. The transmission shift map defines a relationship of the accelerator opening, the vehicle speed, and the target transmission shift stage in the transmission apparatus TM. The transmission shift map sets a plurality of upshift lines and a plurality of downshift lines, and when the vehicle speed and the accelerator opening are changed to cross over the upshift lines or the downshift lines on the transmission shift map, the transmission shift control portion 43 determines a new target transmission shift stage in the transmission apparatus TM, and determines that the transmission shift stage is to be changed. The transmission shift control portion 43 may change the target transmission shift stage when receiving an upshift request or a downshift request according to a change in a select position (shift position) of a shift lever by a driver. The down shift means a change from one transmission shift stage smaller in the transmission shift ratio to another stage larger in the transmission shift ratio, and the up shift means a change from one transmission shift stage larger in the transmission shift ratio to another stage smaller in the transmission shift ratio.

When performing the shift control for switching the transmission shift stage to another, the transmission shift control portion 43 controls the hydraulic pressure instructions for the respective engagement devices C1, B1, . . . , engages or releases the respective engagement devices C1, B1, . . . , and switches the transmission shift stage formed in the transmission apparatus TM to the target transmission shift stage. In this situation, the transmission shift control portion 43 sets the release side engagement device, which is the engagement device to be released for switching between the transmission shift stages, and the engagement side engagement device, which is the engagement device to be engaged for switching between the transmission shift stages. Then, the transmission shift control portion 43 performs a so-called switching shift in which the release side engagement device is released and the engagement side engagement device is engaged according to a shift control sequence scheduled in advance.

Specifically, the transmission shift control portion 43 sets the engagement devices not shared with a plurality of engagement devices forming the transmission shift stage after shifting a gear in the plurality of engagement devices forming the transmission shift stage before shifting the gear for a release side engagement device. The transmission shift control portion 43 sets the engagement devices not shared with a plurality of engagement devices forming the transmission shift stage before shifting the gear in the plurality of engagement devices forming the transmission shift stage after shifting the gear for an engagement side engagement device.

For example, when the transmission shift stage before shifting the gear is the second stage 2nd, and the transmission shift stage after shifting the gear is the third stage 3rd, as illustrated in FIG. 4, the first brake B1 is set for the release side engagement device, and the third clutch C3 is set for the engagement side engagement device.

The engagement side engagement device is released before starting the shift control, and engaged by the shift control. The release side engagement device is engaged before starting the shift control, and released by the shift control.

3-4-2-1. on Upshift Control

The transmission shift control portion 43 is configured to execute an on upshift control for performing an upshift to control the engagement and release of the plurality of engagement devices C1, B1, . . . to switch the transmission shift stage to another transmission shift stage smaller in the transmission shift ratio, from a state where the particular engagement device SSC transmits a torque in a forward acceleration direction to the wheels W in a direct engagement state.

3-4-2-2. Problem on On Upshift Control

First, a problem on the on upshift control will be described with reference to a time chart of a comparative example illustrated in FIG. 5.

In the on upshift control, a period (from a time T03 to a time T04 in FIG. 5) of an inertia phase of the engagement side engagement device in which the rotational speed of the input shaft I (rotary electric machine MG) is reduced from a pre-transmission shift synchronous rotational speed Wbf to an post-transmission shift synchronous rotational speed Waf to decrease a rotational speed difference $\Delta W1$ of the engagement side engagement device is required to be reduced as much as possible. In the on upshift control performed from a state in which the torque in the forward acceleration direction is transmitted to the wheels W, it is desirable that in the inertial phase of the engagement side engagement device, the engagement side engagement device is controlled into the slip engagement state to transmit the driving force of the driving force source to the wheels W side. However, when the period of the inertial phase of the engagement side engagement device is prolonged, because the amount of heat generation in the engagement side engagement device is increased, there is a risk that the durability of the engagement side engagement device is deteriorated. Under the circumstance, in order to improve the durability of the engagement side engagement device, it is desirable that the period of the inertia phase (hereinafter also referred to as "inertia phase") of the engagement side engagement device can be shortened as much as possible.

Figure 5:
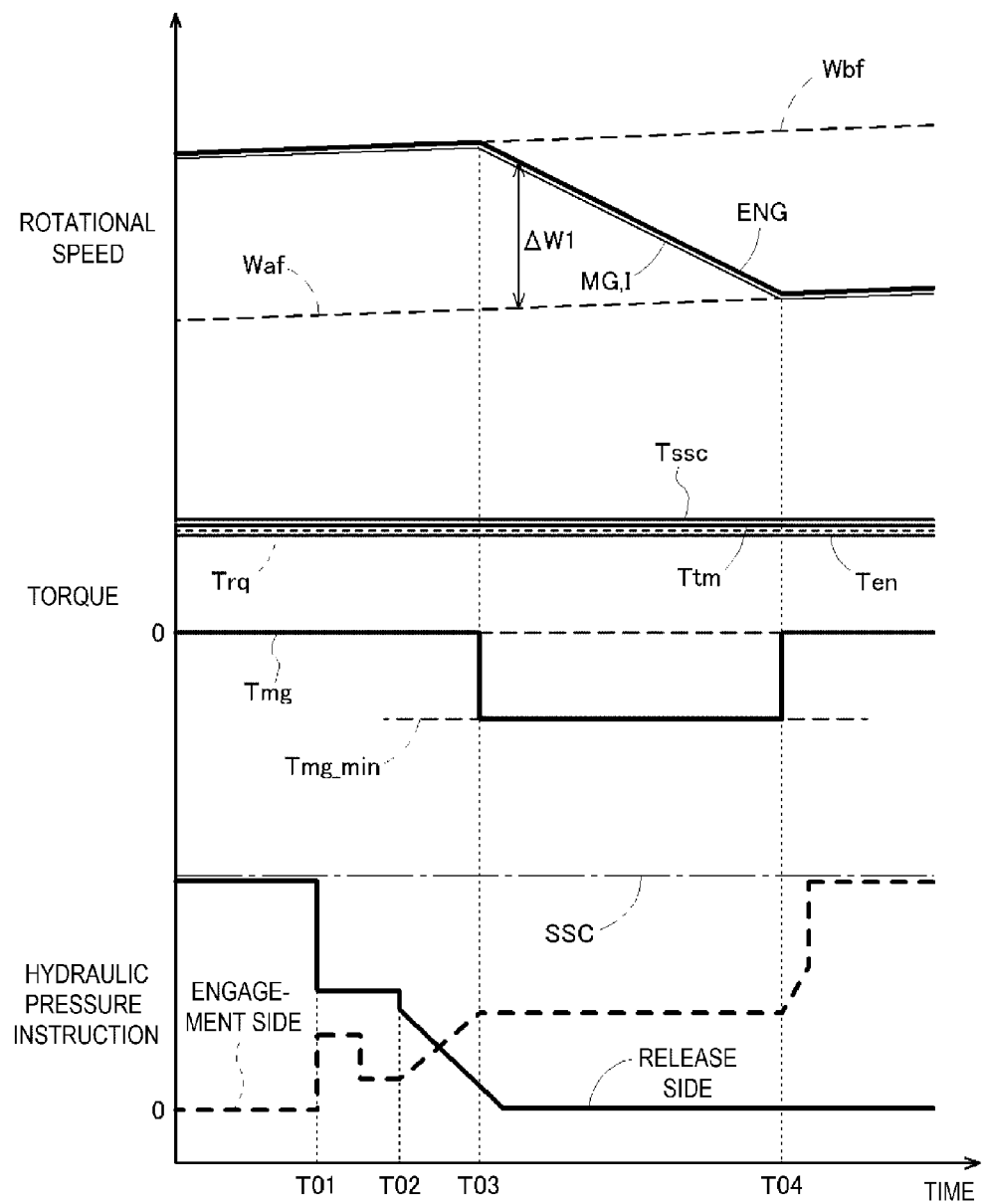
FIG. 5 is a time chart according to a comparative example different from the embodiment of the present disclosure.

In the comparative example illustrated in FIG. 5, unlike the present embodiment, the particular engagement device SSC is maintained in the direct engagement state during the execution of the on upshift control. Hence, in the inertia phase, the internal combustion engine ENG rotates integrally with the input shaft I, and the inertial moment of the rotary member that rotates integrally with the input shaft I is large. In addition, in the inertia phase, a magnitude of the torque that can be used for reducing the rotation of the input shaft I is limited. Hence, when the particular engagement device SSC is controlled into the direct engagement state as in the comparative example, a reduction in the period of the inertia phase is limited, and an improvement in the durability of the engagement side engagement device is limited.

Hereinafter, the comparative example illustrated in FIG. 5 will be described in brief. After the upshift starts at a time T01, a control in a pre-phase is performed in a period from the time T01 to a time T02. In the pre-phase, engagement pressures of the release side engagement device and the engagement side engagement device are changed in advance. Thereafter, a control of the torque phase is performed in a period from the time T02 to a time T03. In the torque phase, the engagement pressure of the engagement side engagement device is increased up to the engagement pressure corresponding to the vehicle request torque Trq, and the engagement side engagement device is brought into the slip engagement state. The engagement pressure of the release side engagement device is reduced to lower than a stroke end pressure, and the release side engagement device is brought into the release state. In this state, the input shaft I is not rotated integrally with the output shaft O, and the inertia system of the input shaft I side is isolated from the inertia system of the output shaft O side.

In a period from the time T03 to the time T04, the control in the inertia phase is performed. In the inertia phase, the rotational speed of the input shaft I is reduced down to the post-transmission shift synchronous rotational speed Waf from the pre-transmission shift synchronous rotational speed Wbf, and the rotational speed difference $\Delta W1$ of the engagement side engagement device is reduced to zero. In order to reduce the rotational speed of the input shaft I as soon as possible, an output torque Tmg of the rotary electric machine MG is reduced to a minimum torque Tmg_min that can be output by the rotary electric machine MG. However, in the comparative example, because the particular engagement device SSC is maintained in the direct engagement state, the internal combustion engine ENG is rotated integrally with the input shaft I, and the inertial moment of the rotary member that is rotated integrally with the input shaft I is large as described above. Hence, in the comparative example, the reduction in the period of the inertia phase is limited, and the improvement in the durability of the engagement side engagement device is limited.

3-4-2-3. Solution by Specific Engagement Slip Control

In order to reduce the period of the inertia phase, the transmission shift control portion 43 according to the present embodiment is configured to perform a specific engagement slip control for controlling the particular engagement device SSC into the slip engagement state and for reducing the rotational speed of the rotary electric machine MG relative to the rotational speed of the internal combustion engine ENG when decreasing a rotational speed difference $\Delta W1$ between a pair of engagement members of the engagement side engagement device that is an engagement device engaged for switching the transmission shift stage to another during execution of the on upshift control.

According to the configuration described above, in the inertia phase for decreasing the rotational speed difference $\Delta W1$ of the engagement side engagement device, since the particular engagement device SSC is controlled into the slip engagement state, the internal combustion engine ENG does not rotate integrally with the input shaft I, and the inertial system of the internal combustion engine ENG can be isolated from the inertia system of the input shaft I. Hence, the inertial moment of the rotary member that rotates integrally with the input shaft I can be remarkably reduced by the inertial moment of the internal combustion engine ENG, and the period of the inertia phase can be reduced.

Further, when the rotational speed difference $\Delta W1$ of the engagement side engagement device is decreased, since the particular engagement device SSC is controlled into the slip engagement state, and the rotational speed of the rotary electric machine MG is reduced relative to the rotational speed of the internal combustion engine ENG, a reduction in the rotational speed of the internal combustion engine ENG in the inertia phase is suppressed. Hence, the driving force used for decreasing the rotational speed of the internal combustion engine ENG can be suppressed to be lower, and the driving force used for decreasing the rotational speed of the input shaft I can be restrained from being reduced. From the above viewpoint, the period of the inertia phase can be reduced.

Therefore, the durability of the engagement side engagement device can be improved.

In the present embodiment, the transmission shift control portion 43 is configured to control both of the engagement side engagement device and the particular engagement device SSC into the slip engagement state when decreasing the rotational speed difference $\Delta W1$ of the engagement side engagement device.

According to the above configuration, in the inertia phase to decrease the rotational speed difference $\Delta W1$ of the engagement side engagement device, an output torque Ten of the internal combustion engine can be transmitted to the wheels W through the particular engagement device SSC and the engagement side engagement device, and the driving force can be restrained from being reduced while shifting the gear.

3-4-2-4. Reduction in Rotational Speed Difference $\Delta W2$ of Particular Engagement Device SSC The transmission shift control portion 43 is configured to decrease the rotational speed difference $\Delta W2$ between the pair of engagement members of the particular engagement device SSC after decreasing the rotational speed difference $\Delta W1$ of the engagement side engagement device down to a predetermined rotational speed difference.

In the present embodiment, the reduction in the rotational speed difference $\Delta W2$ of the particular engagement device SSC is represented by a first configuration example and a second configuration example. Hereinafter, the respective configuration examples will be described.

3-4-2-4-1. First Configuration Example

In the first configuration example, the transmission shift control portion 43 is configured to decrease the rotational speed difference $\Delta W2$ of the particular engagement device SSC to zero after reducing the rotational speed difference $\Delta W1$ of the engagement side engagement device to zero. The configuration will be described with reference to a time chart of FIG. 6.

The transmission shift control portion 43 determines that the on upshift control starts because the target transmission shift stage is changed to the transmission shift stage smaller in the transmission shift ratio at a time T11 in a state where the operation mode is determined to be in the parallel mode, the particular engagement device SSC is controlled into the direct engagement state, the vehicle request torque Trq is set to be larger than zero, and the torque in the forward acceleration direction is transmitted to the wheels W. The target transmission shift stage is changed, for example, when crossing over the upshift lines due to an increase in the vehicle speed, when changing the shift position, or the like.

<Pre-Phase>

In a period from the time T11 to a time T12, the transmission shift control portion 43 controls the pre-phase, and changes the engagement pressures of the release side engagement device and the engagement side engagement device in advance.

In the period from the time T11 to the time T12, the transmission shift control portion 43 reduces the engagement pressure (hydraulic pressure instruction) of the release side engagement device to a release side preliminary pressure larger than a directly connected limit engagement pressure from a full engagement pressure, and increases the engagement pressure (hydraulic pressure instruction) of the engagement side engagement device to an engagement side preliminary pressure smaller than a stroke end pressure by a predetermined pressure from zero. The full engagement pressure represents a maximum engagement pressure (supply hydraulic pressure, hydraulic pressure instruction) set to maintain the engagement state without any slip even if the torque transmitted to the respective engagement devices from the driving force source is varied. The directly connected limit engagement pressure is an engagement pressure (supply hydraulic pressure, hydraulic pressure instruction) at which the engagement devices start to slip.

In order to bring the particular engagement device SSC into the slip engagement state, the transmission shift control portion 43 reduces the engagement pressure (hydraulic pressure instruction) of the particular engagement device SSC to the directly connected limit engagement pressure from the full engagement pressure (time T11). The transmission shift control portion 43 maintains the engagement pressure (hydraulic pressure instruction) of the particular engagement device SSC at the directly connected limit engagement pressure until the inertia phase is terminated (till a time T14). Specifically, the transmission shift control portion 43 sets the internal combustion engine request torque corresponding to the output torque Ten of the internal combustion engine ENG to the transmission torque capacity of the particular engagement device SSC, and calculates the hydraulic pressure instruction for realizing the set transmission torque capacity. When the transmission torque capacity of the particular engagement device SSC falls below the output torque Ten of the internal combustion engine ENG, the particular engagement device SSC starts to slip. The transmission shift control portion 43 transmits the calculated hydraulic pressure instruction of the particular engagement device SSC to the particular engagement control portion 44. In an example illustrated in FIG. 6, the integrated control portion 45 sets the internal combustion engine request torque to a torque corresponding (in this example, equal to) the vehicle request torque Trq even under the shift control at the time T11 to a time T15.

Alternatively, the transmission shift control portion 43 may be configured to reduce the engagement pressure (hydraulic pressure instruction) of the particular engagement device SSC until the rotational speed of the input shaft I is reduced relative to the rotational speed of the internal combustion engine ENG, and the rotational speed difference of the particular engagement device SSC reaches a predetermined determination speed difference or more, <Torque Phase>

The transmission shift control portion 43 controls the torque phase in a period from the time T12 to the time T13 after the pre-phase. Specifically, in the period from the time T12 to the time T13, the transmission shift control portion 43 gradually increases the engagement pressure (hydraulic pressure instruction) of the engagement side engagement device up to the engagement pressure corresponding to the vehicle request torque Trq, brings the engagement side engagement device into the slip engagement state, and gradually decreases the engagement pressure (hydraulic pressure instruction) of the release side engagement device to less than the stroke end pressure to bring the release side engagement device into the release state. Under the control of the torque phase, a relationship of the torque is shifted to a state after shifting the gear. However, a relationship of the rotational speed is maintained in a state before shifting the gear, the engagement side engagement device is brought into the slip engagement state, and the release side engagement device is brought into the release state. In this state, the input shaft I is not rotated integrally with the output shaft O, and the inertia system of the input shaft I side is isolated from the inertia system of the output shaft O side.

The transmission shift control portion 43 determines the increased engagement pressure (hydraulic pressure instruction) of the engagement side engagement device so that a torque Ttm transmitted from the input shaft I side to the output shaft O side by the transmission apparatus TM through the engagement side engagement device of the slip engagement state reaches the torque corresponding to the vehicle request torque Trq. Specifically, the transmission shift control portion 43 multiplies the vehicle request torque Trq by a gear ratio of a gear acting on the engagement side engagement device to calculate the transmission torque capacity of the engagement side engagement device, and calculates the hydraulic pressure instruction for realizing the calculated transmission torque capacity. The transmission shift control portion 43 calculates the hydraulic pressure instruction of the engagement side engagement device so that the engagement side engagement device transmits the torque corresponding to the vehicle request torque Trq continuously even during the inertia phase.

<Inertia Phase>

The transmission shift control portion 43 controls the inertia phase in a period from the time T13 to the time T14 after the torque phase. Specifically, in the period from the time T13 to the time T14, the transmission shift control portion 43 reduces the rotational speed of the input shaft I from the pre-transmission shift synchronous rotational speed Wbf to the post-transmission shift synchronous rotational speed Waf, and reduces the rotational speed difference $\Delta W1$ of the engagement side engagement device to zero.

In this example, the post-transmission shift synchronous rotational speed Waf represents the rotational speed of the input shaft I in a state where the rotational speed difference (slip) of the engagement side engagement device is eliminated, and the transmission shift control portion 43 multiplies the rotational speed of the output shaft O by the transmission shift ratio of the transmission shift stage after shifting the gear to calculate the post-transmission shift synchronous rotational speed Waf. Because the rotational speed difference between the rotational speed of the input shaft I (rotary electric machine MG) and the post-transmission shift synchronous rotational speed Waf is in proportion to the rotational speed difference $\Delta W1$ between the pair of engagement members of the engagement side engagement device, the transmission shift control portion 43 is configured to determine the rotational speed difference $\Delta W1$ of the engagement side engagement device according to the rotational speed difference between the rotational speed of the input shaft I and the post-transmission shift synchronous rotational speed Waf. In this example, the rotational speed of the input shaft I (rotary electric machine MG) corresponds to the rotational speed of the engagement member on an input side of the engagement side engagement device, and the post-transmission shift synchronous rotational speed Waf corresponds to the rotational speed of the engagement member on an output side of the engagement side engagement device.

The pre-transmission shift synchronous rotational speed Wbf represents the rotational speed of the input shaft I in a state where there is no rotational speed difference of the release side engagement device, and the transmission shift control portion 43 multiplies the rotational speed of the output shaft O by the transmission shift ratio of the transmission shift stage before shifting the gear to calculate the pre-transmission shift synchronous rotational speed Wbf.

In the present embodiment, the transmission shift control portion 43 is configured to reduce the output torque Tmg of the rotary electric machine MG so as to reduce the rotational speed of the input shaft I (rotary electric machine MG) and to reduce the rotational speed difference $\Delta W1$ of the engagement side engagement device. In this example, in order to reduce the rotational speed of the rotary electric machine MG as soon as possible, the transmission shift control portion 43 reduces the rotary electric machine request torque from the torque determined by the integrated control portion 45 to the minimum torque Tmg_min that can be output by the rotary electric machine MG by $\Delta T1$. The transmission shift control portion 43 transmits the reduced rotary electric machine request torque to the rotary electric machine control portion 42. In the example illustrated in FIG. 6, the integrated control portion 45 determines the rotary electric machine request torque to zero, and the amount of reduction $\Delta T1$ of the output torque Tmg in the rotary electric machine MG in the inertia phase is equal to the minimum torque Tmg_min.

In this example, a reduction speed (rotational acceleration) to which the rotational speed of the input shaft I is reduced is a value obtained by dividing the inertial moment of the rotary member that rotates integrally with the input shaft I by the amount of reduction $\Delta T1$ of the output torque Tmg in the rotary electric machine MG. The particular engagement device SSC is controlled into the slip engagement state, and the inertia system of the internal combustion engine ENG is isolated from the inertia system of the input shaft I. Therefore, the inertial moment of the input shaft I is remarkably reduced as compared with that in the case of the comparative example in FIG. 5. Hence, the magnitude of the reduction speed of the rotational speed of the input shaft I is remarkably increased more than that in the comparative example of FIG. 5. Hence, a period required to reduce the rotational speed of the input shaft I to the post-transmission shift synchronous rotational speed Waf from the pre-transmission shift synchronous rotational speed Wbf can be remarkably reduced more than that in the comparative example of FIG. 5.

The transmission shift control portion 43 controls the particular engagement device SSC into the slip engagement state and reduces the rotational speed of the rotary electric machine MG relative to the rotational speed of the internal combustion engine ENG, while decreasing the rotational speed difference $\Delta W1$ of the engagement side engagement device (from the time T13 to the time T14). Since the rotational speed of the rotary electric machine MG is reduced relative to the rotational speed of the internal combustion engine ENG in a state where the particular engagement device SSC is brought in the slip engagement state, the rotational speed difference $\Delta W2$ of the particular engagement device SSC is increased. Both of the engagement side engagement device and the particular engagement device SSC are controlled into the slip engagement state. Meanwhile, the rotational speed difference $\Delta W2$ of the pair of engagement members of the particular engagement device SSC corresponds to the rotational speed difference between the rotational speed of the internal combustion engine ENG and the rotational speed of the input shaft I (rotary electric machine MG). In this example, the rotational speed of the internal combustion engine ENG corresponds to the rotational speed of the engagement member on the input side of the particular engagement device SSC, and the rotational speed of the input shaft I (rotary electric machine MG) corresponds to the rotational speed of the engagement member on the output side of the particular engagement device SSC.

In the present embodiment, the transmission shift control portion 43 is configured to maintain the rotational speed of the internal combustion engine ENG at the rotational speed corresponding to the rotational speed of the internal combustion engine ENG before starting the on upshift control while increasing the rotational speed difference $\Delta W2$ of the particular engagement device SSC (from the time T13 to the time T14). Specifically, the transmission shift control portion 43 controls the output torque Ten of the internal combustion engine ENG and a torque Tssc that is transmitted to the particular engagement device SSC so as to balance those torques with each other so that the rotational speed of the internal combustion engine ENG is maintained at the neighborhood of the pre-transmission shift synchronous rotational speed Wbf at the time of starting the inertia phase (time T13) (for example, between 80% and 120% of the pre-transmission shift synchronous rotational speed Wbf at the time of starting the inertia phase). As a result, the rotational speed of the internal combustion engine ENG is restrained from being changed, and maintained at the neighborhood of the pre-transmission shift synchronous rotational speed Wbf.

Figure 6:
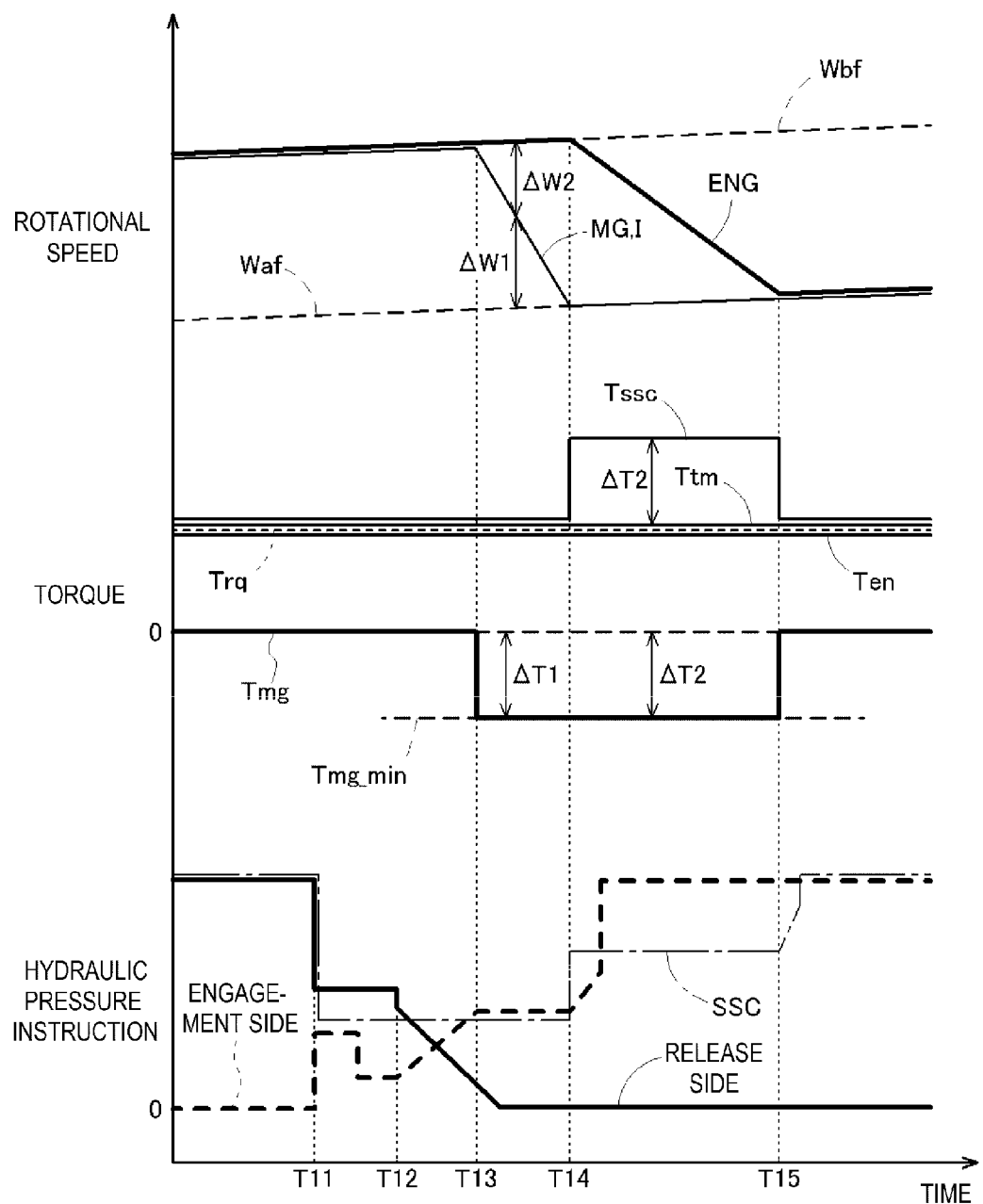
FIG. 6 is a time chart according to a first configuration example of the embodiment of the present disclosure.

In the example illustrated in FIG. 6, as described above, the internal combustion engine request torque is determined to be a torque corresponding to (in this example, equal to) the vehicle request torque Trq by the integrated control portion 45. As described above, the transmission shift control portion 43 calculates the hydraulic pressure instruction of the particular engagement device SSC so that the transmission torque capacity of the particular engagement device SSC matches the magnitude of the output torque Ten of the internal combustion engine ENG.

When it is determined that the rotational speed difference $\Delta W1$ of the engagement side engagement device (in the present embodiment, the rotational speed difference between the rotational speed of the input shaft I and the post-transmission shift synchronous rotational speed Waf) becomes equal to or less than a predetermined determination speed difference (time T14), the transmission shift control portion 43 increases the engagement pressure (hydraulic pressure instruction) of the engagement side engagement device from the engagement pressure corresponding to the vehicle request torque Trq to the full engagement pressure to bring the engagement side engagement device into the direct engagement state.

<Reduction in Rotational Speed Difference $\Delta W2$ of Particular Engagement Device SSC>

In the first configuration example, the transmission shift control portion 43 is configured to reduce the rotational speed difference $\Delta W2$ of the particular engagement device SSC to zero after reducing the rotational speed difference $\Delta W1$ of the engagement side engagement device to zero (from the time T14 to the time T15), In the present embodiment, the transmission shift control portion 43 is configured to reduce the rotational speed of the internal combustion engine ENG from the rotational speed corresponding to the rotational speed of the internal combustion engine ENG before starting the on upshift control (in this example, the rotational speed close to the pre-transmission shift synchronous rotational speed Wbf at the time of starting the inertia phase) while decreasing the rotational speed difference $\Delta W2$ of the particular engagement device SSC.

The transmission shift control portion 43 increases the transmission torque capacity (engagement pressure) of the particular engagement device SSC to decrease the rotational speed difference ΔW2 of the particular engagement device SSC and reduces the output torque Tmg of the rotary electric machine MG according to an increase in the transmission torque capacity (engagement pressure) of the particular engagement device SSC.

According to the above configuration, because the total torque acting on the inertial system of the internal combustion engine ENG can be made negative due to the increase in the transmission torque capacity (engagement pressure) of the particular engagement device SSC, the rotational speed of the internal combustion engine ENG is reduced. In addition, the transmission torque (slip torque) of the particular engagement device SSC to be transmitted from the internal combustion engine ENG side to the input shaft I side increases due to an increase in the transmission torque capacity (engagement pressure) of the particular engagement device SSC. Since the output torque Tmg of the rotary electric machine MG is reduced according to the increase in the transmission torque capacity (engagement pressure) of the particular engagement device SSC, the increase in the transmission torque of the particular engagement device SSC is offset by the reduction in the output torque Tmg of the rotary electric machine MG. Hence, the torque Ttm to be transmitted to the output shaft O side through the engagement side engagement device that has been brought into the direct engagement state can be restrained from being varied.

In the example illustrated in FIG. 6, the transmission shift control portion 43 reduces the rotary electric machine request torque from the torque (in this example, zero) determined by the integrated control portion 45 to the minimum torque Tmg_min that can be output by the rotary electric machine MG, and sets the amount of decrease ΔT2 in the output torque Tmg of the rotary electric machine MG to a settable maximum amount. In addition, the transmission shift control portion 43 increases the engagement pressure (hydraulic pressure instruction) of the particular engagement device SSC so that the transmission torque capacity of the particular engagement device SSC increases from the torque capacity corresponding to the internal combustion engine request torque by the amount of decrease ΔT2 in the rotary electric machine request torque. As a result, the rotational speed of the internal combustion engine ENG can be reduced as soon as possible while the torque to be transmitted to the output shaft O side is restrained from being varied.

When the transmission shift control portion 43 determines that the rotational speed difference ΔW2 of the particular engagement device SSC (in the present embodiment, the rotational speed difference between the rotational speed of the internal combustion engine ENG and the rotational speed of the input shaft I) becomes equal to or less than a predetermined determination speed difference (time T15), the transmission shift control portion 43 increases the engagement pressure (hydraulic pressure instruction) of the particular engagement device SSC up to the full engagement pressure to bring the particular engagement device SSC into the direct engagement state. When the particular engagement device SSC is put into the direct engagement state, the output torque Ten of the internal combustion engine ENG is transmitted to the particular engagement device SSC.

In addition, when the transmission shift control portion 43 determines that the rotational speed difference ΔW2 of the particular engagement device SSC becomes equal to or less than the predetermined determination speed difference (time T15), the transmission shift control portion 43 completes the control for reducing the output torque Tmg of the rotary electric machine MG according to an increase in the engagement pressure of the particular engagement device SSC, and sets the rotary electric machine torque request torque to the torque (in this example, zero) determined by the integrated control portion 45.

<Flowchart of First Configuration Example>

Figure 7:
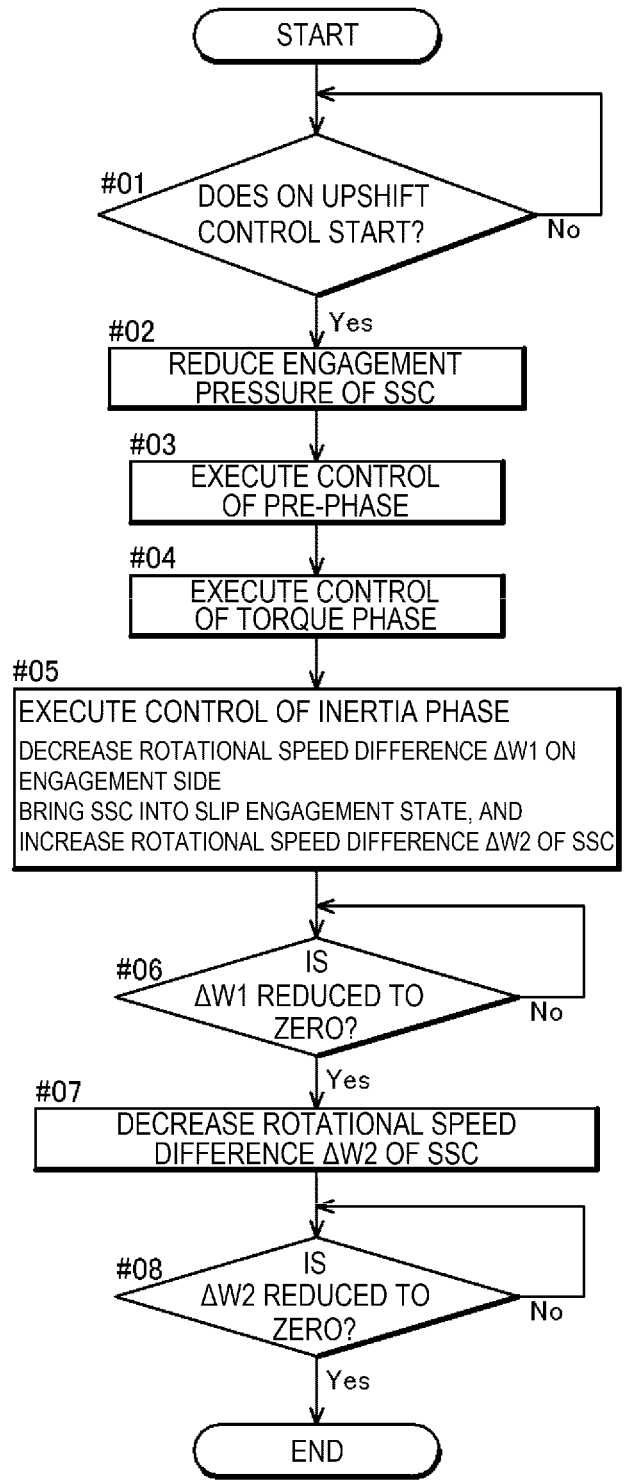
FIG. 7 is a flowchart according to the first configuration example of the embodiment of the present disclosure.

Next, a process of the on upshift control in the first configuration example will be described with reference to a flowchart of FIG. 7.

First, the transmission shift control portion 43 determines whether a condition for starting the on upshift control is satisfied, or not (Step #01). If the start condition of the on upshift control is satisfied (yes in Step #01), the transmission shift control portion 43 executes a control for reducing the engagement pressure (hydraulic pressure instruction) of the particular engagement device SSC in order to put the particular engagement device SSC into the slip engagement state (Step #02). In addition, if the start condition of the on upshift control is satisfied (yes in Step #01), the transmission shift control portion 43 executes the control of the pre-phase described above (Step #03). The transmission shift control portion 43 executes the control of the torque phase described above after the completion of the control of the pre-phase (Step #04).

After the completion of the control of the torque phase, the transmission shift control portion 43 executes the control of the inertia phase described above (Step #05). Specifically, when the rotational speed difference ΔW1 of the engagement side engagement device is decreased, the transmission shift control portion 43 controls the particular engagement device SSC into the slip engagement state, and reduces the rotational speed of the rotary electric machine MG relative to the rotational speed of the internal combustion engine ENG.

The transmission shift control portion 43 determines whether the rotational speed difference ΔW1 of the engagement side engagement device is reduced to zero, or not (Step #06). When the transmission shift control portion 43 determines that the rotational speed difference ΔW1 of the engagement side engagement device is reduced to zero (yes in Step #06), the transmission shift control portion 43 executes a control for reducing the rotational speed difference ΔW2 of the particular engagement device SSC to zero (Step #07). When the transmission shift control portion 43 determines that the rotational speed difference ΔW2 of the particular engagement device SSC is reduced to zero (yes in Step #08), the transmission shift control portion 43 completes the process of the on upshift control.

3-4-2-4-2. Second Configuration Example

Figure 8:
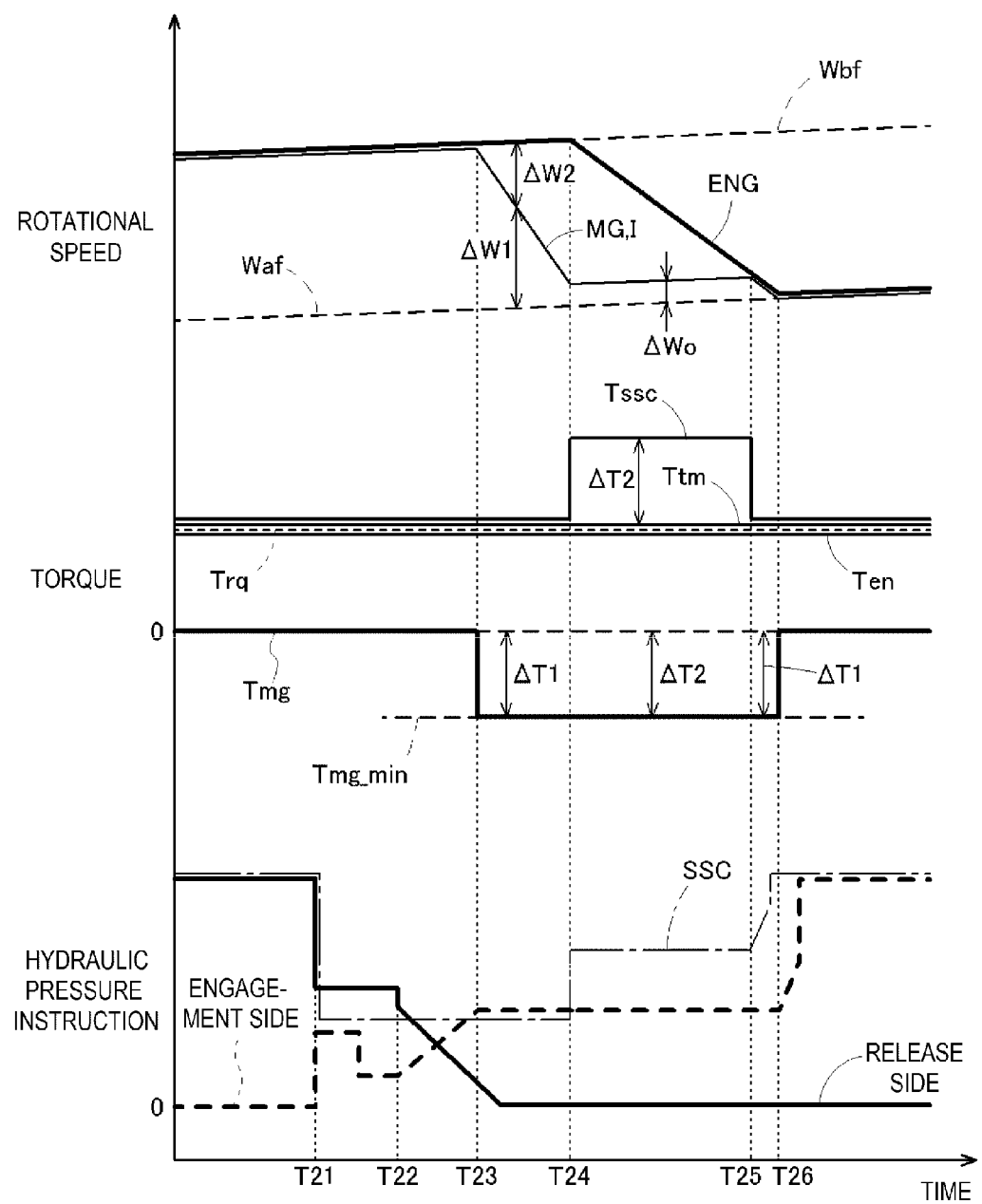
FIG. 8 is a time chart according to a second configuration example of the embodiment of the present disclosure.

In the second configuration example, the transmission shift control portion 43 is configured to decrease the rotational speed difference ΔW2 of the particular engagement device SSC down to zero after decreasing the rotational speed difference ΔW1 of the engagement side engagement device down to a target rotational speed difference ΔWo set to a value larger than zero in advance, and thereafter to decrease the rotational speed difference ΔW1 of the engagement side engagement device down to zero. This configuration will be described with reference to a time chart of FIG. 8. A time chart immediately before a time T24 in FIG. 8 is identical with the time chart immediately before the time T14 in FIG. 6, and therefore its description will be omitted.

In the present embodiment, when the transmission shift control portion 43 determines that the rotational speed difference ΔW1 of the engagement side engagement device becomes equal to or less than the target rotational speed difference ΔWo (the time T24), the transmission shift control portion 43 starts to decrease the rotational speed difference ΔW2 of the particular engagement device SSC.

After reducing the rotational speed difference ΔW2 of the particular engagement device SSC to zero (after a time T25), the transmission shift control portion 43 reduces the rotational speed difference ΔW1 of the engagement side engagement device to zero (a time T26). Since the engagement side engagement device is maintained in the slip engagement state during decreasing the rotational speed difference ΔW2 of the particular engagement device SSC (from the time T24 to the time T25), a torque fluctuation caused by the decrease in the rotational speed difference ΔW2 of the particular engagement device SSC can be restrained from being transmitted to the output shaft O side.

In addition, since the rotational speed difference ΔW1 of the engagement side engagement device is decreased down to the target rotational speed difference ΔWo, although the amount of heat generation per unit time of the engagement side engagement device cannot be reduced to zero as in the first configuration example, the amount of heat generation can be remarkably reduced by the decrease in the rotational speed difference ΔW1, and the durability of the engagement side engagement device can be improved. Meanwhile, the amount of heat generation per unit time of the engagement device is proportional to a value obtained by multiplying the transmission torque of the engagement device by the rotational speed difference of the engagement device.

As in the first configuration example (from the time T14 to the time T15), the transmission shift control portion 43 is configured to reduce the rotational speed of the internal combustion engine ENG from the rotational speed corresponding to the rotational speed of the internal combustion engine ENG before starting the on upshift control (in this example, the rotational speed close to the pre-transmission shift synchronous rotational speed Wbf at the time of starting the inertia phase (a time T23)) while decreasing the rotational speed difference ΔW2 of the particular engagement device SSC (from the time T24 to the time T25).

In addition, as in the first configuration example (from the time T14 to the time T15), the transmission shift control portion 43 is configured to increase the engagement pressure of the particular engagement device SSC to decrease the rotational speed difference ΔW2 of the particular engagement device SSC, and reduce the output torque Tmg of the rotary electric machine MG by ΔT2 according to an increase in the engagement pressure of the particular engagement device SSC (from the time T24 to the time T25).

In the present embodiment, the transmission shift control portion 43 is configured to execute a rotational speed control for changing the output torque Tmg of the rotary electric machine MG so that the rotational speed difference ΔW1 of the engagement side engagement device is maintained at the target rotational speed difference ΔWo after reducing the rotational speed difference ΔW1 of the engagement side engagement device to the target rotational speed difference ΔWo (from the time T24 to the time T25).

Specifically, the transmission shift control portion 43 is configured to set the rotational speed obtained by adding the target rotational speed difference ΔWo to the post-transmission shift synchronous rotational speed Waf to the target rotational speed, and to perform a rotational speed control for changing the rotary electric machine request torque so that the rotational speed of the rotary electric machine MG comes close to the target rotational speed. Under the rotational speed control, the output torque Tmg of the rotary electric machine MG is automatically reduced according to an increase in the engagement pressure of the particular engagement device SSC.

Under the rotational speed control, the rotational speed difference ΔW1 of the engagement side engagement device can be maintained at the target rotational speed difference ΔWo more surely, and maintained in the slip engagement state.

When the transmission shift control portion 43 determines that the rotational speed difference ΔW2 of the particular engagement device SSC becomes equal to or less than the predetermined determination speed difference (the time T25), the transmission shift control portion 43 increases the engagement pressure (hydraulic pressure instruction) of the particular engagement device SSC to the full engagement pressure, and brings the particular engagement device SSC into the direct engagement state. When the particular engagement device SSC is brought into the direct engagement state, the output torque Ten of the internal combustion engine ENG is transmitted to the particular engagement device SSC (after the time T25).

In addition, when the transmission shift control portion 43 determines that the rotational speed difference ΔW2 of the particular engagement device SSC becomes equal to or less than the predetermined determination speed difference (the time T25), the transmission shift control portion 43 completes the control for reducing the output torque Tmg of the rotary electric machine MG according to an increase in the engagement pressure of the particular engagement device SSC, and sets the rotary electric machine request torque to the torque (in this example, zero) determined by the integrated control portion 45.

The transmission shift control portion 43 is configured to execute a control for reducing the rotational speed difference ΔW1 of the engagement side engagement device to zero when the transmission shift control portion 43 determines that the rotational speed difference ΔW2 of the particular engagement device SSC becomes equal to or less than the predetermined determination speed difference (the time T25) (from the time T25 to the time T26).

As with the time T23 to the time T24, the transmission shift control portion 43 is configured to reduce the output torque Tmg of the rotary electric machine MG by ΔT1 so as to reduce the rotational speed difference ΔW1 of the engagement side engagement device to zero.

Alternatively, the transmission shift control portion 43 may be configured to continue the rotational speed control of the rotary electric machine MG, and gradually decrease the target rotational speed difference ΔWo to zero, to thereby reduce the rotational speed difference ΔW1 of the engagement side engagement device to zero.

When the transmission shift control portion 43 determines that the rotational speed difference ΔW1 of the engagement side engagement device becomes equal to or less than the predetermined determination speed difference (the time T26), the transmission shift control portion 43 increases the engagement pressure (hydraulic pressure instruction) of the engagement side engagement device from the engagement pressure corresponding to the vehicle request torque Trq to the full engagement pressure to shift the engagement side engagement device to the direct engagement state.

<Flowchart of Second Configuration Example>

Figure 9:
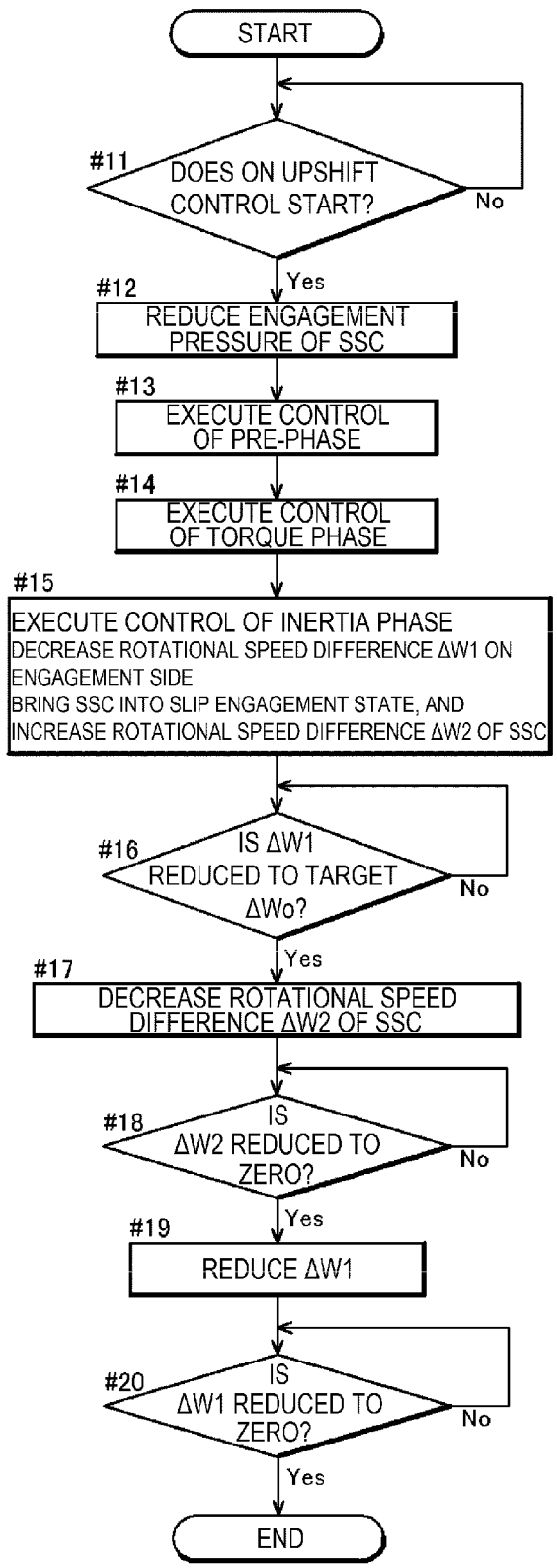
FIG. 9 is a flowchart according to the second configuration example of the embodiment of the present disclosure.

Next, a process of the on upshift control in the second configuration example will be described with reference to a flowchart of FIG. 9.

First, the transmission shift control portion 43 determines whether a condition for starting the on upshift control is satisfied, or not (Step #11), If the start condition of the on upshift control is satisfied (yes in Step #11), the transmission shift control portion 43 executes a control for reducing the engagement pressure (hydraulic pressure instruction) of the particular engagement device SSC in order to put the particular engagement device SSC into the slip engagement state (Step #12). In addition, if the start condition of the on upshift control is satisfied (yes in Step #11), the transmission shift control portion 43 executes the control of the pre-phase described above (Step #13). The transmission shift control portion 43 executes the control of the torque phase described above after the completion of the control of the pre-phase (Step #14).

After the completion of the control of the torque phase, the transmission shift control portion 43 executes the control of the inertia phase described above (Step #15). Specifically, when the rotational speed difference $\Delta W1$ of the engagement side engagement device is decreased, the transmission shift control portion 43 controls the particular engagement device SSC into the slip engagement state, and reduces the rotational speed of the rotary electric machine MG relative to the rotational speed of the internal combustion engine ENG.

The transmission shift control portion 43 determines whether the rotational speed difference $\Delta W1$ of the engagement side engagement device is reduced to the target rotational speed difference $\Delta Wo$, or not (Step #16). When the transmission shift control portion 43 determines that the rotational speed difference $\Delta W1$ of the engagement side engagement device is reduced to the target rotational speed difference $\Delta Wo$ (yes in Step #16), the transmission shift control portion 43 executes a control for reducing the rotational speed difference $\Delta W2$ of the particular engagement device SSC to zero (Step #17). When the transmission shift control portion 43 determines that the rotational speed difference $\Delta W2$ of the particular engagement device SSC is reduced to zero (yes in Step #18), the transmission shift control portion 43 executes a control for reducing the rotational speed difference $\Delta W1$ of the engagement side engagement device to zero (Step #19). When the transmission shift control portion 43 determines that the rotational speed difference $\Delta W1$ of the engagement side engagement device is reduced to zero (yes in Step #20), the transmission shift control portion 43 completes the process of the on upshift control.

[Other Embodiments]

Finally, other embodiments of the disclosure will be described. Incidentally, the configurations of respective embodiments described below are not limited to those respectively applied alone, but as long as no conflict arises, can be applied in combination with the configuration of other embodiments.

(1) In the above embodiment, the control device 30 includes the plurality of control units 32 to 34, and the plurality of functional portions 41 to 45 are assigned to the plurality of control units 32 to 34. However, the embodiment of the disclosure is not limited to the above configuration. In other words, the control device 30 may be configured by a control device in which the plurality of control units 32 to 34 described above are integrated together or isolated from each other in an arbitrary combination, and the allocation of the plurality of functional portions 41 to 45 may be determined arbitrarily.

(2) In the embodiment described above, the transmission apparatus TM includes the two planetary gear mechanisms, the six engagement devices, and the six forward transmission shift stages, and each of the transmission shift stages is formed by engaging the two engagement devices with each other. However, the embodiment of the disclosure is not limited to the above configuration. In other words, the transmission apparatus TM may have any configuration if two or more transmission shift stages formed by the engagement of at least one engagement device are provided. In other words, the transmission apparatus TM may include two or more, or one planetary gear mechanism, may include two or more engagement devices, and may include two or more forward transmission shift stages. Each of the transmission shift stages may be formed by the engagement of one engagement device, or the engagement of three or more engagement devices.

(3) In the embodiment described above, the transmission shift control portion 43 is configured to control both of the engagement side engagement device and the particular engagement device SSC into the slip engagement state when decreasing the rotational speed difference $\Delta W1$ of the engagement side engagement device. However, the embodiment of the disclosure is not limited to the above configuration. In other words, the transmission shift control portion 43 may control at least the particular engagement device SSC into the slip engagement state when decreasing the rotational speed difference $\Delta W1$ of the engagement side engagement device, and may be configured to control the engagement side engagement device into the release state.

(4) In the embodiment described above, the transmission shift control portion 43 is configured to reduce the output torque Tmg of the rotary electric machine MG to reduce the rotational speed of the rotary electric machine MG, decrease the rotational speed difference $\Delta W1$ of the engagement side engagement device, control the particular engagement device SSC into the slip engagement state, and reduce the rotational speed of the rotary electric machine MG relative to the rotational speed of the internal combustion engine ENG. However, the embodiment of the disclosure is not limited to the above configuration. In other words, the transmission shift control portion 43 may be configured to reduce the engagement pressure of the particular engagement device SSC more than the directly connected limit engagement pressure or to increase the engagement pressure of the engagement side engagement device more than the engagement pressure corresponding to the vehicle request torque Trq, to thereby reduce the rotational speed of the rotary electric machine MG, decrease the rotational speed difference $\Delta W1$ of the engagement side engagement device, control the particular engagement device SSC into the slip engagement state, and reduce the rotational speed of the rotary electric machine MG relative to the rotational speed of the internal combustion engine ENG.

(5) In the first configuration example described above, the transmission shift control portion 43 is configured to decrease the rotational speed difference $\Delta W2$ of the particular engagement device SSC to zero after reducing the rotational speed difference $\Delta W1$ of the engagement side engagement device to zero. However, the embodiment of the disclosure is not limited to the above configuration. In other words, the transmission shift control portion 43 may be configured to start the decrease in the rotational speed difference $\Delta W2$ of the particular engagement device SSC before the rotational speed difference $\Delta W1$ of the engagement side engagement device is reduced to zero. In other words, a decrease period of the rotational speed difference $\Delta W1$ of the engagement side engagement device may overlap with a decrease period of the rotational speed difference $\Delta W2$ of the particular engagement device SSC.

(6) In the second configuration example described above, the transmission shift control portion 43 is configured to decrease the rotational speed difference ΔW2 of the particular engagement device SSC to zero after reducing the rotational speed difference ΔW1 of the engagement side engagement device to the target rotational speed difference ΔWo. However, the embodiment of the disclosure is not limited to the above configuration. In other words, the transmission shift control portion 43 may be configured to start the decrease in the rotational speed difference ΔW2 of the particular engagement device SSC before the rotational speed difference ΔW1 of the engagement side engagement device is reduced to the target rotational speed difference ΔWo. In other words, a decrease period of the rotational speed difference ΔW1 of the engagement side engagement device may overlap with a decrease period of the rotational speed difference ΔW2 of the particular engagement device SSC.

(7) In the second configuration example of the embodiment described above, the transmission shift control portion 43 is configured to execute the rotational speed control for changing the output torque Tmg of the rotary electric machine MG so that the rotational speed difference ΔW1 of the engagement side engagement device is maintained at the target rotational speed difference ΔWo. However, the embodiment of the disclosure is not limited to the above configuration. In other words, the transmission shift control portion 43 may be configured to execute the rotational speed control for changing the engagement pressure of the particular engagement device SSC or the engagement pressure of the engagement side engagement device such that the rotational speed difference ΔW1 of the engagement side engagement device is maintained at the target rotational speed difference ΔWo.

(8) In the embodiment described above, the transmission shift control portion 43 is configured to control the particular engagement device SSC into the slip engagement state, and also maintain the rotational speed of the internal combustion engine ENG at the rotational speed corresponding to the rotational speed of the internal combustion engine ENG before starting the on upshift control while decreasing the rotational speed of the rotary electric machine MG relative to the rotational speed of the internal combustion engine ENG. However, the embodiment of the disclosure is not limited to the above configuration. In other words, the transmission shift control portion 43 is configured to control the particular engagement device SSC into the slip engagement state, and also increase or decrease the rotational speed of the internal combustion engine ENG from the rotational speed corresponding to the rotational speed of the internal combustion engine ENG before starting the on upshift control while decreasing the rotational speed of the rotary electric machine MG relative to the rotational speed of the internal combustion engine ENG.

(9) In the embodiment described above, the transmission shift control portion 43 is configured to increase the engagement pressure of the particular engagement device SSC to decrease the rotational speed difference ΔW2 of the particular engagement device SSC, and reduce the output torque Tmg of the rotary electric machine MG according to the increase in the engagement pressure of the particular engagement device SSC. However, the embodiment of the disclosure is not limited to the above configuration. In other words, the transmission shift control portion 43 may be configured to reduce the output torque Ten (internal combustion engine request torque) of the internal combustion engine ENG to decrease the rotational speed difference ΔW2 of the particular engagement device SSC.

(10) In the embodiment described above, the particular engagement device SSC is configured to reduce the supply hydraulic pressure (hydraulic pressure instruction) so as to reduce the transmission torque capacity (engagement pressure), However, the embodiment of the disclosure is not limited to the above configuration. In other words, the particular engagement device SSC may be configured to increase the supply hydraulic pressure (hydraulic pressure instruction) so as to reduce the transmission torque capacity (engagement pressure). In that case, for example, a return spring is urged against the engagement side, and the supply hydraulic pressure to the particular engagement device SSC is pressed toward the release side.

INDUSTRIAL APPLICABILITY

The present disclosure can be preferably used for the control device for controlling the vehicle driving device having the particular engagement device, the rotary electric machine, and the transmission apparatus disposed in the power transmission path coupling the internal combustion engine with the wheels in order from the internal combustion engine side.

The invention claimed is:

1. A control device for a vehicle driving device which controls the vehicle driving device provided with a particular engagement device, a rotary electric machine, and a transmission apparatus disposed in a power transmission path coupling an internal combustion engine with wheels in order from the internal combustion engine side,
wherein the transmission apparatus includes a plurality of engagement devices, and selectively forms a plurality of transmission shift stages different in transmission shift ratio according to a state of engagement of the plurality of engagement devices; the control device comprising:
an electronic control unit that includes control logic, which when executed:
executes an on upshift control for controlling engagement and release of the plurality of engagement devices to switch the transmission shift stage to a transmission shift stage smaller in the transmission shift ratio from a state in which the particular engagement device transmits a torque in a forward acceleration direction to the wheels in a direct engagement state; and
controls the particular engagement device into a slip engagement state, and reduces a rotational speed of the rotary electric machine relative to a rotational speed of the internal combustion engine when decreasing a rotational speed difference between a pair of engagement members of engagement side engagement device which is the engagement device engaged for switching the transmission shift stage during execution of the on upshift control.

2. The control device for a vehicle driving device according to claim 1, wherein the electronic control unit controls both of the engagement side engagement device and the particular engagement device into the slip engagement state when decreasing the rotational speed difference of the engagement side engagement device.

3. The control device for a vehicle driving device according to claim 1, wherein the electronic control unit reduces the output torque of the rotary electric machine, to thereby reduce the rotational speed of the rotary electric machine, and decrease the rotational speed difference of the engagement side engagement device.

4. The control device for a vehicle driving device according to claim 1, wherein the electronic control unit decreases the rotational speed difference between the pair of engagement members of the particular engagement device after decreasing the rotational speed difference of the engagement side engagement device down to a predetermined rotational speed difference.

5. The control device for a vehicle driving device according to claim 4, wherein the electronic control unit decreases the rotational speed difference of the particular engagement device down to zero after decreasing the rotational speed difference of the engagement side engagement device down to zero.

6. The control device for a vehicle driving device according to claim 4, wherein the electronic control unit decreases the rotational speed difference of the particular engagement device down to zero after decreasing the rotational speed difference of the engagement side engagement device down to a target rotational speed difference set to a value larger than zero in advance, and thereafter decreases the rotational speed difference of the engagement side engagement device down to zero.

7. The control device for a vehicle driving device according to claim 6, wherein the electronic control unit executes a rotational speed control for changing the output torque of the rotary electric machine so that the rotational speed difference of the engagement side engagement device is maintained at the target rotational speed difference after decreasing the rotational speed difference of the engagement side engagement device down to the target rotational speed difference.

8. The control device for a vehicle driving device according to claim 4, wherein the electronic control unit maintains the rotational speed of the internal combustion engine at the rotational speed corresponding to the rotational speed of the internal combustion engine before starting the on upshift control while increasing the rotational speed difference of the particular engagement device, and reduces the rotational speed of the internal combustion engine from the rotational speed corresponding to the rotational speed of the internal combustion engine before starting the on upshift control while decreasing the rotational speed difference of the particular engagement device.

9. The control device for a vehicle driving device according to claim 4, wherein the electronic control unit increases a transmission torque capacity of the particular engagement device to decrease the rotational speed difference of the particular engagement device and reduces the output torque of the rotary electric machine according to an increase in the transmission torque capacity of the particular engagement device.

10. The control device for a vehicle driving device according to claim 2, wherein the electronic control unit reduces the output torque of the rotary electric machine, to thereby reduce the rotational speed of the rotary electric machine, and decrease the rotational speed difference of the engagement side engagement device.

11. The control device for a vehicle driving device according to claim 2, wherein the electronic control unit decreases the rotational speed difference between the pair of engagement members of the particular engagement device after decreasing the rotational speed difference of the engagement side engagement device down to a predetermined rotational speed difference.

12. The control device for a vehicle driving device according to claim 5, wherein the electronic control unit maintains the rotational speed of the internal combustion engine at the rotational speed corresponding to the rotational speed of the internal combustion engine before starting the on upshift control while increasing the rotational speed difference of the particular engagement device, and reduces the rotational speed of the internal combustion engine from the rotational speed corresponding to the rotational speed of the internal combustion engine before starting the on upshift control while decreasing the rotational speed difference of the particular engagement device.

13. The control device for a vehicle driving device according to claim 5, wherein the electronic control unit increases a transmission torque capacity of the particular engagement device to decrease the rotational speed difference of the particular engagement device and reduces the output torque of the rotary electric machine according to an increase in the transmission torque capacity of the particular engagement device.

14. The control device for a vehicle driving device according to claim 3, wherein the electronic control unit decreases the rotational speed difference between the pair of engagement members of the particular engagement device after decreasing the rotational speed difference of the engagement side engagement device down to a predetermined rotational speed difference.

15. The control device for a vehicle driving device according to claim 6, wherein the electronic control unit maintains the rotational speed of the internal combustion engine at the rotational speed corresponding to the rotational speed of the internal combustion engine before starting the on upshift control while increasing the rotational speed difference of the particular engagement device, and reduces the rotational speed of the internal combustion engine from the rotational speed corresponding to the rotational speed of the internal combustion engine before starting the on upshift control while decreasing the rotational speed difference of the particular engagement device.

16. The control device for a vehicle driving device according to claim 6, wherein the electronic control unit increases a transmission torque capacity of the particular engagement device to decrease the rotational speed difference of the particular engagement device and reduces the output torque of the rotary electric machine according to an increase in the transmission torque capacity of the particular engagement device.

17. The control device for a vehicle driving device according to claim 7, wherein the electronic control unit maintains the rotational speed of the internal combustion engine at the rotational speed corresponding to the rotational speed of the internal combustion engine before starting the on upshift control while increasing the rotational speed difference of the particular engagement device, and reduces the rotational speed of the internal combustion engine from the rotational speed corresponding to the rotational speed of the internal combustion engine before starting the on upshift control while decreasing the rotational speed difference of the particular engagement device.

18. The control device for a vehicle driving device according to claim 12, wherein the electronic control unit increases a transmission torque capacity of the particular engagement device to decrease the rotational speed difference of the particular engagement device and reduces the output torque of the rotary electric machine according to an increase in the transmission torque capacity of the particular engagement device.

19. The control device for a vehicle driving device according to claim 10, wherein the electronic control unit decreases the rotational speed difference between the pair of engagement members of the particular engagement device after decreasing the rotational speed difference of the engagement side engagement device down to a predetermined rotational speed difference.

20. The control device for a vehicle driving device according to claim 19, wherein the electronic control unit decreases the rotational speed difference of the particular engagement device down to zero after decreasing the rotational speed difference of the engagement side engagement device down to zero.

* * * * *